(12) United States Patent
Poniatowski et al.

(10) Patent No.: US 10,553,130 B2
(45) Date of Patent: Feb. 4, 2020

(54) SYSTEMS AND METHODS FOR ANALYZING SURGICAL TECHNIQUES

(71) Applicants: Lauren H. Poniatowski, St. Paul, MN (US); Robert M. Sweet, Edina, MN (US); Troy E. Reihsen, St. Paul, MN (US); Vincent Rotty, Rochester, MN (US); David Hananel, Minneapolis, MN (US); Jack B. Stubbs, Minneapolis, MN (US); Astrini Sie, Jakarta Utara (ID); Michael Winek, Brentwood, TN (US); Timothy M. Kowalewski, Saint Paul, MN (US)

(72) Inventors: Lauren H. Poniatowski, St. Paul, MN (US); Robert M. Sweet, Edina, MN (US); Troy E. Reihsen, St. Paul, MN (US); Vincent Rotty, Rochester, MN (US); David Hananel, Minneapolis, MN (US); Jack B. Stubbs, Minneapolis, MN (US); Astrini Sie, Jakarta Utara (ID); Michael Winek, Brentwood, TN (US); Timothy M. Kowalewski, Saint Paul, MN (US)

(73) Assignee: Regents of the University of Minnesota, Minneapolis, MN (US)

(*) Notice: Subject to any disclaimer, the term of this patent is extended or adjusted under 35 U.S.C. 154(b) by 1414 days.

(21) Appl. No.: 14/398,090

(22) PCT Filed: Feb. 20, 2013

(86) PCT No.: PCT/US2013/026933
§ 371 (c)(1),
(2) Date: Oct. 30, 2014

(87) PCT Pub. No.: WO2013/165529
PCT Pub. Date: Nov. 7, 2013

(65) Prior Publication Data
US 2015/0086955 A1    Mar. 26, 2015

Related U.S. Application Data

(60) Provisional application No. 61/642,117, filed on May 3, 2012.

(51) Int. Cl.
*G09B 23/30* (2006.01)
*G06T 7/00* (2017.01)

(52) U.S. Cl.
CPC ............ *G09B 23/30* (2013.01); *G06T 7/0014* (2013.01); *G06T 2207/20092* (2013.01); *G06T 2207/30004* (2013.01)

(58) Field of Classification Search
CPC .... G09B 23/28; G09B 23/303; G09B 23/285; G09B 23/24; G09B 5/02; G09B 23/30;
(Continued)

(56) References Cited

U.S. PATENT DOCUMENTS 6,428,323 B1    8/2002   Pugh
9,805,624 B2   10/2017   Reihsen et al.
(Continued)

FOREIGN PATENT DOCUMENTS

GB        2212371 A      7/1989
WO   WO-2011067707 A2    6/2011
(Continued)

OTHER PUBLICATIONS

"U.S. Appl. No. 13/630,715, Examiner Interview Summary dated Mar. 24, 2014", 3 pgs.
(Continued)

*Primary Examiner* — Samchuan C Yao
*Assistant Examiner* — Lily M Del Valle
(74) *Attorney, Agent, or Firm* — Schwegman Lundberg & Woessner, P.A.

(57) ABSTRACT

A system for assessing performance of a procedure comprises a tissue model or a tool comprising assessment indicators applied thereto, one or more image-capturing devices for capturing one or more assessment images of the assessment indicators while or after a user performs the medical procedure, and a processor configured to analyze the assessment indicators in the one or more assessment images and provide feedback to the user. A system can also comprise a tissue model, one or more image-capturing devices each configured to capture one or more images of the tissue model, and a processor configured to analyze the one or more images from the one or more image-capturing devices to determine a deformation of the tissue model and determine a force exerted on the tissue model based on the determined deformation of the tissue model.

6 Claims, 13 Drawing Sheets

(58) Field of Classification Search
CPC .. G09B 23/286; G09B 23/306; G06T 7/0014; G06T 2207/20081; G06T 2207/30096; G06T 2207/30004; G06T 2207/20092
USPC ................................ 434/267, 262, 268, 272
See application file for complete search history.

(56) References Cited

U.S. PATENT DOCUMENTS

| | | | |
|---|---|---|---|
| 2004/0002642 | A1 | 1/2004 | Dekel et al. |
| 2004/0153128 | A1* | 8/2004 | Suresh ................ G06F 19/3437 607/14 |
| 2007/0003749 | A1 | 1/2007 | Asgari |
| 2007/0140413 | A1* | 6/2007 | Saracen .................... A61B 6/08 378/18 |
| 2008/0208549 | A1 | 8/2008 | Gaved et al. |
| 2009/0268865 | A1* | 10/2009 | Ren ...................... A61B 6/0414 378/37 |
| 2009/0292198 | A1* | 11/2009 | Kleiven ................. A61B 5/031 600/416 |
| 2010/0167251 | A1* | 7/2010 | Boutchko .............. A61B 5/416 434/267 |
| 2010/0168763 | A1 | 7/2010 | Zhao et al. |
| 2010/0228114 | A1* | 9/2010 | Bille ...................... G16H 50/50 600/398 |
| 2010/0248200 | A1 | 9/2010 | Ladak et al. |
| 2012/0082970 | A1* | 4/2012 | Pravong ............... G09B 23/285 434/262 |
| 2013/0085736 | A1* | 4/2013 | Reihsen ................. G09B 23/28 703/11 |
| 2018/0075778 | A1 | 3/2018 | Reihsen et al. |

FOREIGN PATENT DOCUMENTS

| | | |
|---|---|---|
| WO | WO-2011150257 A2 | 12/2011 |
| WO | WO-2013165529 A2 | 11/2013 |
| WO | WO-2013165529 A3 | 11/2013 |

OTHER PUBLICATIONS

"U.S. Appl. No. 13/630,715, Final Office Action dated Oct. 10, 2014", 21 pgs.
"U.S. Appl. No. 13/630,715, Non Final Office Action dated Nov. 8, 2013", 27 pgs.
"U.S. Appl. No. 13/630,715, Response filed Apr. 7, 2014 to Non Final Office Action dated Nov. 8, 2013", 23 pgs.
"International Application Serial No. PCT/US2013/026933, International Search Report dated Dec. 19, 2013", 6 pgs.
"International Application Serial No. PCT/US2013/026933, Invitation to Pay Additional Fees and Partial Search Report dated Sep. 27, 2013", 5 pgs.
"International Application Serial No. PCT/US2013/026933, Written Opinion dated Dec. 19, 2013", 7 pgs.
Berfield, "Fluorescent Image Correlation for Nanoscale Deformation Measurements", Small, vol. 2, (2006), 631-635.
Hutmacher, "Scaffold design and fabrication technologies for engineering tissues—state of the art and future perspectives", J. Biomater. Sci., Polymer Edn., vol. 12, (2001), 107-124.
Kunkler, Kevin, et al., "Integrated Sensor Technology into Synthetic Anatomical Training", SITIS—SBIR/STTR Interactive Topic Information System, (Apr. 27, 2012).
Moroni, "3D fiber-deposited scaffolds for tissue engineering: Influence of pores geometry and architecture on dynamic mechanical properties", Biomaterials, vol. 27, (2006), 974-985.
Santra, "Synthesis and Characterization of Fluorescent, Radio-Opaque, and Paramagnetic Silica Nanoparticles for Multimodal Bioimaging Applications", vol. 17, (2005), 2165 pg.
Stevens, "A review of materials, fabrication methods, and strategies used to enhance bone regeneration in engineered bone tissues", J Biomed Mater Res Part B: Appl Biomater, vol. 85B, (2007), 573-582.
"U.S. Appl. No. 13/630,715, Advisory Action dated Jan. 29, 2015", 3 pgs.
"U.S. Appl. No. 13/630,715, Advisory Action dated May 5, 2016", 4 pgs.
"U.S. Appl. No. 13/630,715, Examiner Interview Summary dated Jan. 7, 2015", 3 pgs.
"U.S. Appl. No. 13/630,715, Examiner Interview Summary dated Feb. 20, 2015", 3 pgs.
"U.S. Appl. No. 13/630,715, Examiner Interview Summary dated Mar. 23, 2016", 3 pgs.
"U.S. Appl. No. 13/630,715, Examiner Interview Summary dated Jul. 27, 2015", 3 pgs.
"U.S. Appl. No. 13/630,715, Final Office Action dated Jan. 20, 2016", 22 pgs.
"U.S. Appl. No. 13/630,715, Non Final Office Action dated Apr. 23, 2015", 17 pgs.
"U.S. Appl. No. 13/630,715, Response filed Feb. 10, 2015 to Final Office Action dated Oct. 10, 2014", 20 pgs.
"U.S. Appl. No. 13/630,715, Response filed Apr. 19, 2016 to Final Office Action dated Jan. 20, 2016", 28 pgs.
"U.S. Appl. No. 13/630,715, Response filed Sep. 23, 2015 to Non Final Office Action dated Apr. 23, 2015", 17 pgs.
"U.S. Appl. No. 13/630,715, Response filed Dec. 19, 2014 to Final Office Action dated Oct. 10, 2014", 19 pgs.
"Internnational Application Serial No. PCT/US2013/026933, International Preliminary Report on Patenetability dated Nov. 13, 2014", 9 pgs.
Kerdok, Amy E., et al., "Truth cube: Establishing physical standards for soft tissue simulation", *Medical Image Analysis*, 7, (2003), 283-291.
"U.S. Appl. No. 13/630,715, Notice of Allowance dated Jun. 29, 2017", 8 pgs.
"U.S. Appl. No. 13/630,715 Response Filed Jun. 20, 2017 to Examiner-Initiated Interview conducted on Jun. 15, 2017", 12 pgs.
"U.S. Appl. No. 13/630,715, Response Filed May 17, 2017 to Non Final Office Action dated Feb. 24, 2017", 15 pgs.
"U.S. Appl. No. 13/630,715, Non Final Office Action dated Feb. 24, 2017", 8 pgs.
"U.S. Appl. No. 13/630,715, Response filed Jul. 19, 2016 to Advisory Action dated May 5, 2016", 31 pgs.
"U.S. Appl. No. 15/690,574, Preliminary Amendment filed Mar. 1, 2018", 7 pgs.
"U.S. Appl. No. 15/690,574, Supplemental Preliminary Amendment filed Jul. 23, 2018", 4 pgs.
"My Weigh. "iBalance 601 & M01"", [online]. [archived Nov. 26, 2010]. Retrieved from the Internet: <URL: https://web.archive.org/web/20101126100640/https://myweigh.com/scales/medium-scales/ibalance-601-amp-m01>, (2010), 5 pgs.
"Overview of Image Registration Techniques", 1984-2012 The MathWorks, Inc. [online]. [archived on Sep. 6, 2012]. Retrieved

(56) References Cited

OTHER PUBLICATIONS from the Internet: <URL: https://web.archive.org/web/20120906022109/http://www.mathworks.com/help/todbox/images/f20-14791.html>, (2012), 1 pg.
"Performing General 2-D Spatial Transformations", (c) 1994-2012 The MathWorks Inc., [online]. [archived Aug. 4, 2012]. Retrieved from the Internet: <URL: https://web.archive.org/web/20120804031648/http://www.mathworks.com/help/toolbox/images/f12-26140.html>, (2012), 4 pgs.
"PlatSil Gel 10", Polytek(r) Development Corp., (C) 2005-2010 Polytek [online]. [archived on Nov. 30, 2010]. Retrieved from the Internet: <URL: https://web.archive.org/web/20101130083545/https://www.polytek.com/cart/index.php?target=products&product_id=29873>, (2010), 2 pgs.
"Silicone Thinner(r)", Smooth-On, Inc. (c) 2011 [online]. [archived on Apr. 5, 2012]. Retrieved from the Internet: <URL: https://web.archive.org/web/20120405223910/http://www.smooth-on.com/Silicone-Rubber-Ac/c1128_1196/index.html>, (2011), 2 pgs.
"Smith's Theatrical Prosthetic Deadener", Polytek(r) Development Corp. [online]. [archived on Oct. 29, 2010]. Retrieved from the Internet: <URL: https://web.archive.org/web/20101129222504/http://www.polytek.com/cart/index.php?target=categories&category_id=368>, (2010), 2 pgs.
Brook, Michael, "Platinum in silicone breast implants", Biomaterials 27(17), (2006), 3274-3286.
Carberry, J., et al., "Parametric Design of an Active Ankle Foot Orthosis with Passive Compliance", IEEE 24th International Symposium on Computer-Based Medical Systems, (2011), 1-6.
Chmarra, M. K., et al., "TrEndo, a device for tracking minimally invasive surgical instruments in training setups", Sens. Actuators A, 126(2), (2006), 328-334.
Colas, Andre, et al., "Silicone Biomaterials: History and Chemistry & Medical Applications of Silicones", Materials Science, 2nd Edition. Elsevier Inc., Editors: Ratner, B. D., et al., [online]. Retrieved from the Internet: <URL: http://www.dowcorning.com/content/publishedlit/52-1069-01.pdf>, (2005), 80-86, 697-707 (20 pages).
Evans, Robert L., et al., "Demonstration Paper: A Comparative Study of Surgical Skills Assessment in a Physical Laparoscopy Simulator Using Wireless Inertial Sensors", Wireless Health '14, Oct. 29-31, 2014, Bethesda, MD, ACM Press, (2014), 1-8.
Figueroa, P. J., et al., "A flexible software for tracking of markers used in human motion analysis", Computer Methods and Programs in Biomedicine, 72(2), (Oct. 2003), 155-165.
Holzapfel, Gerhard A., et al., "Determination of layer-speci?c mechanical properties of human coronary arteries with nonatherosclerotic intimal thickening and related constitutive modeling", Am J Physiol Heart Circ Physiol., 289, (2005), H2048-H2058.
Hsieh, Hsiang-Wen, et al., "Localization of an Underwater Robot with inertial Sensor Fusion Models", 2010 5th IEEE Conference on Industrial Electronics and Applications, (2010), 1562-1567.
McNaugton, D., et al., "Motion Path Analysis Tool for Cerebral Palsy Patients", Rice University, [online]. Retrieved from the Internet: URL: <https://sites.psu.edu/resnasdc/2014/05131/motion-path-analysis-tool-for-cerebral-palsy-patients-rice-university/, (May 31, 2014), 6 pgs.
Platt, A. J., et al., "A new method for the assessment of suturing ability", J R Coll Surg Edinb., 42(6), (1997), 383-385.
Poniatowski, Lauren, "User Feedback for Suturing Exercise using Black Light Assessment of Surgical Technique (BLAST) and Image Processing in MATLAB", Submitted to the University Honors Program at the University of Minnesota—Twin Cities in partial fulfillment of the requirements for the degree of Bachelor of Biomedical Engineering, (May 4, 2012), 12 pgs.
Reihsen, Troy E., et al., "Cost-effective, Simulated, Representative (Human) High-Fidelity Organosilicate Models", Interservice/Industry Training, Simulation, and Education Conference (I/ITSEC) 2011, (2011), 7 pages.
Shen, Y., et al., "Haptic Herniorrhaphy Simulation with Robust and Fast Collision Detection Algorithm", Studies in Health Technology and Informatics, 111, (2005), 458-464.
Shen, Y., et al., "Laser surgery simulation platform: toward full-procedure training and rehearsal for benign prostatic hyperplasia (BPH) therapy", Stud. Health Technol.Inform., 163, (2011), 574-580.
Shen, Yunhe, et al., "Motion Tracking and Sensor Fusion Design for VR/AR Based Medical Simulation Interfaces", Poster MD17, Posters in Medical Devices, The Annual Conference and Retreat, Institute for Engineering in Medicine, (Sep. 22, 2014), 1 pg.
Sweet, Robert M., et al., "A Unified Approach to Validation, Reliability, and Education Study Design for Surgical Technical Skills Training", Arch. Surg., 145(2), (Feb. 2010), 197-201.
Welch, G., et al., "5.4 Single-Constraint-at-a-Time (SCATT)", In: Course 8—An introduction to the Kalman Filter, SIGGRAPH 2001, (2001), p. 41.
Yun, Xiaoping, et al., "Self-contained position tracking of human movement using small inertial/magnetic sensor modules", IEEE International Conference on Robotics and Automation, (2007), 2526-2533.

\* cited by examiner

SYSTEMS AND METHODS FOR ANALYZING SURGICAL TECHNIQUES

RELATED APPLICATIONS

This patent application is a U.S. National Application filed under 35 U.S.C. § 371 from International Application Serial No. PCT/US2013/026933, which was filed Feb. 20, 2013, and published as WO 2013/165529 on Nov. 7, 2013, which claims the benefit of priority to Poniatowski et al., U.S. Provisional Patent Application Ser. No. 61/642,117, entitled "METHOD FOR ANALYZING SURGICAL TECHNIQUE USING ASSESSMENT MARKERS AND IMAGE ANALYSIS," filed on May 3, 2012, which is herein incorporated by reference in its entirety. The subject matter of this application is also related to Reihsen et al., U.S. Provisional Patent Application Ser. No. 61/541,547, entitled "SIMULATED, REPRESENTATIVE HIGH-FIDELITY ORGANOSILICATE TISSUE MODELS," filed on Sep. 30, 2011, to Reihsen et al., U.S. Provisional Patent Application Ser. No. 61/589,463, entitled "SIMULATED, REPRESENTATIVE HIGH-FIDELITY ORGANOSILICATE TISSUE MODELS," filed on Jan. 23, 2012, and to Reihsen et al., U.S. application Ser. No. 13/630,715, entitled "SIMULATED, REPRESENTATIVE HIGH-FIDELITY ORGANOSILICATE TISSUE MODELS," filed on Sep. 28, 2012, which application are hereby incorporated by reference as if reproduced herein and made a part hereof in their entirety, and the benefit of priority for each of which is claimed herein.

BACKGROUND

Simulation of medical procedures is becoming a more prominent part of medical training. Currently, tissue models, such as animal tissue, human cadaveric tissue, or simulated, artificial tissue are used for medical education. Medical students can perform surgical or other medical techniques on the tissue model, and their performance can be evaluated by trainers. Automatic and quantitative analysis of performance can be used because it can permit a student to assess performance without a trainer having to observe the actual procedure and because it permits reliable, repeatable, objective assessment. However, current methods of automatic analysis focus on tracking the instruments used for a procedure, such as with positional sensors mounted to the instruments. While instrument tracking can provide an approximate measure of how well the procedure was done, final performance analysis can still call for inspection by a trainer, such as a proctor. Moreover, instrument tracking can fail to recognize or evaluate the effect on the tissue model, such as tissue tension or tearing.

SUMMARY

The present disclosure is directed to systems and methods for analyzing and evaluating medical procedures that are performed on a tissue or a tissue model. The system and method can use assessment indicators or sensors that can be analyzed by image analysis or sensor output analysis, or both, to provide automatic feedback to a student. The system and method can be configured to determine a quantitative score for a particular instance of the medical procedure that a student and faculty can use to measure performance and to track improvement over time and can become part of the student's record.

The system and method can also use a marker material comprising dye-impregnated or dye-infused capsules that release the dye at a pre-specified pressure or force to provide an indication of when a threshold pressure or force is being applied to the tissue model.

The system and method can also use one or more cameras to view and record a tissue model in real time in order to determine the force being exerted on the tissue model based on known physical characteristics of the tissue model, such as the dynamic modulus, Young's modulus, the elastic modulus, and the like. The system and method can also be configured to determine internal pressure buildup due to the calculated applied force and the deformation of the tissue model.

In an example, this disclosure is directed to a system for assessing performance of a medical procedure, the system comprising a tissue model or a tool comprising assessment indicators applied thereto, one or more image-capturing devices for capturing one or more assessment images of the assessment indicators while or after a user performs the medical procedure, and a processor configured to analyze the assessment indicators in the one or more assessment images and provide feedback to the user.

In another example, this disclosure is directed to a system for assessing performance of a procedure, the system comprising a tissue model, one or more image-capturing devices each configured to capture one or more images of the tissue model, and a processor configured to analyze the one or more images from the one or more image-capturing devices to determine a deformation of the tissue model and determine a force exerted on the tissue model based on the determined deformation of the tissue model.

In yet another example, this disclosure is directed to a synthetic tissue model simulating a tissue for a medical procedure, the synthetic tissue model comprising a base material and capsules applied to the base material, the capsules being impregnated with a material, wherein the capsules are configured to expose the material upon exposure to a stimulus source exceeding a stimulus threshold.

These and other examples and features of the present system and related methods will be set forth, in part, in the following Detailed Description. This summary is intended to provide an overview of subject matter of the present disclosure. It is not intended to provide an exclusive or exhaustive explanation of the invention. The detailed description is included to provide further information about the present disclosure.

DETAILED DESCRIPTION

The present disclosure is directed to systems and methods for analyzing and evaluating surgical techniques that are performed on a tissue or a tissue model. The system and method can use assessment indicators or sensors embedded or present in the tissue or tissue model that can be analyzed by image analysis or sensor output analysis, or both, to provide automatic feedback.

The system and methods can include a tissue or tissue model with indicators or sensors, or both, that can be viewed or detected by a computer system and analyzed after a medical procedure has been completed and can provide a quantitative score for the performance The score can be determined based on selected parameters, such as preservation of the tissue or tissue model, tension on the tissue or tissue model, overlap of the tissue or the tissue model, approximation of the tissue or the tissue model, exposure of a portion of the tissue or the tissue model. The quantitative score can provide an objective measure of performance in a specific instance of the medical procedure, or it can provide an indication of progress over time as the procedure is repeated and subsequent scores can be compared.

Figure 1:
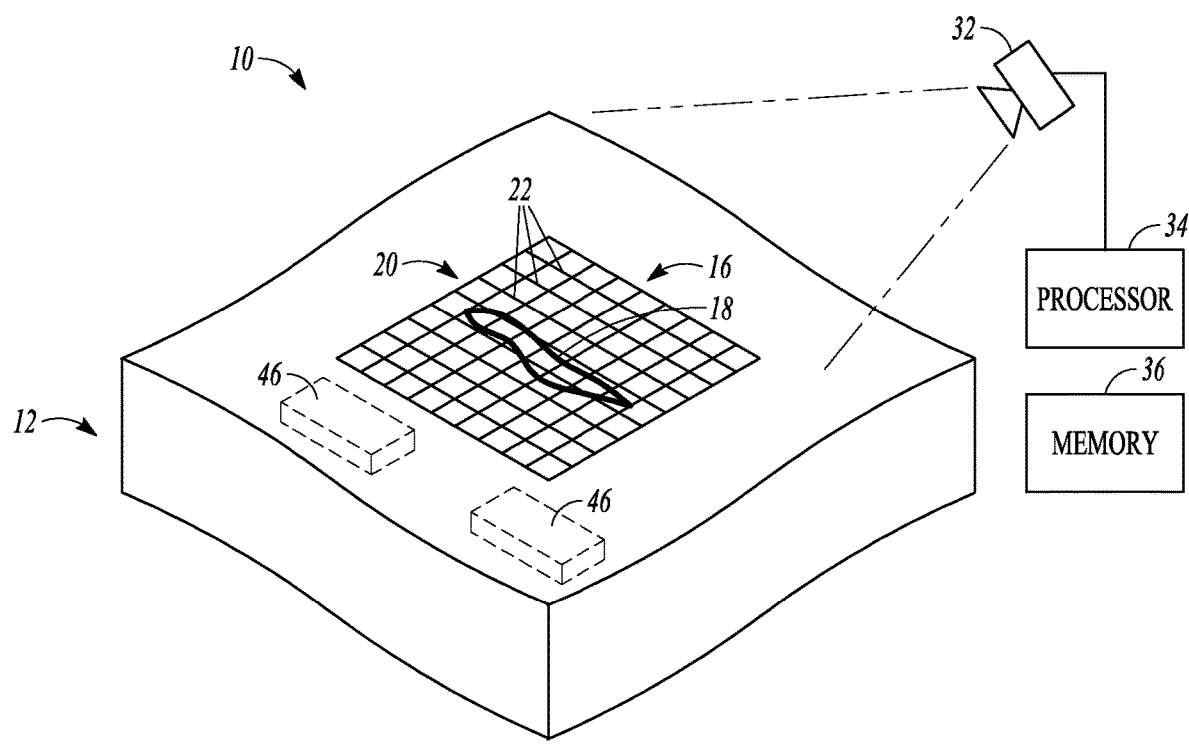
FIG. 1 is a diagram of an example system for assessing performance of a medical procedure.

FIG. 1 shows an example of a system 10 that can assess performance of a medical procedure. The medical procedure can include a surgical procedure or a non-surgical medical procedure. In an example, the system 10 includes a tissue or tissue model 12 on which the procedure will be performed. The tissue or tissue model 12 can be actual tissue from the actual type of patient that the student is training for, such as human tissue for a medical school student, intern, or resident. The tissue or tissue model 12 can also be a material configured to simulate the actual tissue for the type of patient that the student is training for, e.g., a tissue model that simulates human tissue for a medical school student, intern, or resident. For the purpose of brevity, tissue or tissue model will be referred to throughout this application as "tissue model," because it is envisioned that the system and methods will most commonly be used with simulated tissue models rather than actual living tissue. The tissue model 12 can be formerly living tissue, such as animal tissue models or cadaveric human tissue, or it can be an artificial tissue model, such as an organosilicate-based tissue, described in more detail below.

The tissue model 12 can include one or more assessment indicators, such as assessment markings applied to the tissue model 12, which can provide for visual assessment of the tissue model 12. The assessment markings can include visible assessment markings comprising a material that is visible to the human eye under normal conditions to indicate to a user, such as a trainee or student, a proper position for an aspect of a procedure, such as the location where a trainee should perform a particular action, such as clipping, cutting, dissecting, or suturing the tissue model. The visible assessment markings can include an ink or dye applied to one or more layers or surfaces of the tissue model 12.

In addition to or in place of visible assessment markings, the tissue model 12 can also can also include one or more assessment markings 16 of a material that is invisible or substantially invisible under normal light so that the assessment markings 16 will not be seen by a user of the tissue model 12, such as a trainee or student. The assessment markings 16 can be formed from an indicator material that is latently detectable, such as by only being visible or otherwise detectable under specific conditions, for example when the tissue model 12 is illuminated under light having a specific wavelength, such as UV light. The indicator material of the assessment markings 16 can then be made to be visible to the trainee or an evaluator after completion of the procedure to determine the effectiveness of the procedure.

The indicator material that forms the assessment markings 16 can comprise a coating that is sensitive to a particular wavelength or range of wavelengths of light. In an example, the indicator material can include an ultraviolet light sensitive material that fluoresces when the indicator material is exposed to UV light. For the sake of brevity, the indicator material will be described as a UV-sensitive indicator material. However, a person of ordinary skill in the art can appreciate that materials sensitive to other wavelengths of light, such as infrared light, can be used.

The indicator material that forms the assessment markings 16 can be added onto or into the tissue model 12, for example on one organosilicate layer or between organosilicate tissue layers, at specified locations. In an example, the indicator material comprises a polymer resin that can be applied to one or more layers or surfaces of the tissue model 12 to form the latently-detectable assessment markings 16. The indicator material that forms the assessment markings 16 can be applied in lines, dots, or other patterns, or can be incorporated across an entire surface of a layer of the tissue model 12 or through an entire layer of the tissue model 12.

While performing a specified task, such as a medical procedure, the user (e.g., a trainee) can be unaware of the indicator material coating patterns on the tissue model 12 due to their transparent nature under normal light. Following completion of a task by the user, an evaluation of his or her ability to perform the task can be made by exposing the tissue model 12 under UV light where the UV-sensitive indicator material can reveal the coating pattern. In an example, UV-sensitive coatings can be applied to fluoresce in more than one color when exposed to UV light, such as a first color for a first pattern of assessment markings 16, and a second color for a second pattern of assessment markings 16.

The indicator material that forms the assessment markings 16 can be created from UV pigments that are natural or synthetic minerals, which can then be added to a base material, such as a polymer resin or a base material of the tissue model 12, such as an organosilicate base. The base can then be agitated to ensure a complete homogenous mixture. The pigments can be in a powder form. Examples of pigments which make up the colors of blue, red, white, yellow, orange, or green can be selected from the following list of minerals: adamite, agate, albite, alunite, amber, amblygonite, analcime andersonite, anglesite, anthrophyllite, apatite, aphthitalite, apoplyllite, aragonite, autunite, axinite, barite, becquerelite, boltwoodite, brucite, cahnite, calcite, caloimel, celestite, cerrusite, chondrodite, clinohedrite, corundrum, cowlesite, datolite, dioside, dypinite, espertite, eucryptite, fluorite, foshagite, gaylusite, gowerite, gypsum, halite, hanksite, hemimorphite, hydroboracite, idrialite, laumontite, magnesite, margarosanite, melanophlogite, mesolite, meta-autunite, meyerofferite, montebrasite, nahcolite, natrolite, norbergite, opal, pectolite, phosphuranylite, pirssonite, plombierite, powelite, pyrophylite, quartz, scapolite, scheelinte, smithsonite, sodalite, soddylite, sphalerite, spodumene, stilbite, strontianite, talc, thaumasite, thomsonite, tirodite, tremolite, trona, ulexite, uralolite, urannopilite, uranocirite, walstromite, wavellite, whewellite, willemite, witherite, wollastonite, wulfenite, wurtziste, xonotlite, zincite, zippeite, zircon.

Fluorescent pigments can be combined to create custom colors that can match the tissue, or contrast based on need. Embedment of commercial off the shelf (COTS) indicators can also be used. An example would be of Clear Neon Black Light Paint.

In an example, photochromatic or piezochromatic materials can provide for a color change based on contact or pressure applied to a particular location of the tissue model 12 that can provide for a non UV-based goal for measurement. A thermochromatic material exposed to heat can also be used, and would produce a similar effect. Chemical indicators can also be used using a steam, or chemical acid/base interaction and can provide similar results.

The assessment markings 16 can be located on an outer surface of the tissue model 12, or can be located in or on one or more internal layers of the tissue model 12, or both. The location of the assessment markings 16 can depend on the specific procedure being assessed. The assessment markings 16 can be added within or between one or more layers of the tissue model 12 in order to provide for skill proficiency training and evaluation. The assessment markings 16 can be added as lines, dots, or other indicating patterns that can be used to indicate or determine proper performance of a particular task. For example, when evaluating suturing technique for the repair of a wound or incision 18, the assessment markings 16 can be formed as a grid 20 of lines 22 positioned on an outer surface of the tissue model 12 proximate to and around the location of the wound or incision 18. The grid 20 can be analyzed, as described in more detail below, in order to assess tension on the tissue model 12 during suturing, overlap of the tissue model 12 at the juncture of the wound or incision 18, or approximation of the tissue model 12 around the wound or incision 18. An indicator material can be applied to an entire layer or layers of the tissue model 12, e.g., so that the layer or layers themselves can act as assessment markings 16 so that if the layer is exposed during the procedure, it can be detected for analysis.

In an example, the assessment markings 16 can be arranged in a two-dimensional pattern, such as a square geometric grid, a triangular geometric grid, a pattern including simple or compound curves, and the like, that can be positioned on the outer surface of the tissue model 12. The two-dimensional pattern of the assessment markings 16 can be configured so that it will be altered by the procedure in predictable ways. For example, for a suturing procedure, individual lines 22 of the grid 20 will be deformed in predictable ways depending on the tension on the tissue model 12 from sutures that are placed in the tissue model 12 by a trainee.

Figure 2:
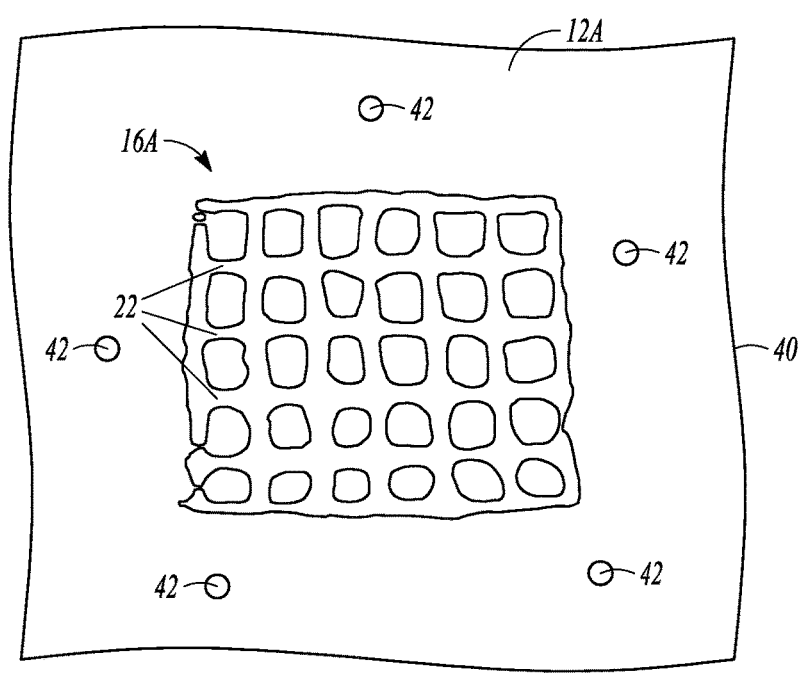
FIG. 2 is a diagram of an example reference image of a tissue model with assessment indicators applied thereto.
Figure 3:
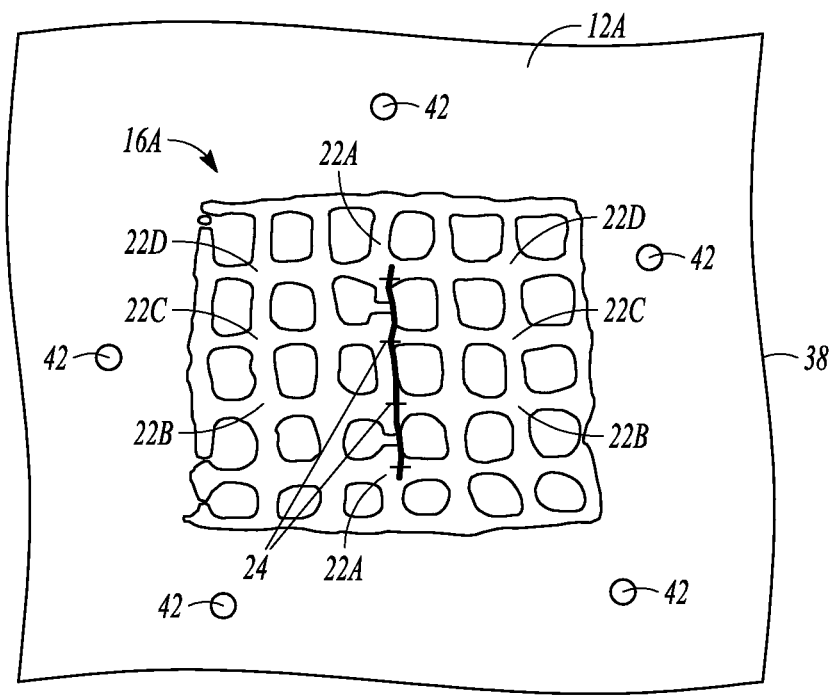
FIG. 3 is a diagram of an example assessment image of a tissue model with assessment indicators applied thereto.

FIGS. 2 and 3, described in more detail below, show an example of assessment markings 16A on a tissue model 12A comprising a two-dimensional pattern, such as the grid 20 of lines 22, that can be used to assess deformation of the tissue model 12A. FIG. 1 shows the tissue model 12A with a wound or incision 18 and the grid 20 before a suturing procedure has been performed. FIG. 2 shows assessment markings 16A as they would appear under a UV light, where the assessment markings 16A can be used as a reference for image processing. FIG. 3 shows the same tissue model 12A after the wound or incision 18 has been repaired by sutures 24. FIG. 3 shows assessment markings 16A as they would appear under a UV light, where the assessment markings 16A can be compared to the reference markings of the reference image via image processing. The grid lines 22 can be moved as a result of the tension applied by the sutures 24. In the examples shown in FIGS. 2 and 3, the grid 20 is altered by the suturing procedure in that a first vertical grid line 22A has become broken and shortened by the suturing procedure, while a second, horizontal grid line 22B, a third, horizontal grid line 22C, and a fourth, horizontal grid line 22D have become misaligned, with one side of each grid line 22B, 22C, 22D being shifted vertically downward on one side of the sutured wound or incision 18 with respect to the other side of the wound or incision 18 (FIG. 1). As described in more detail below, the alterations in specific grid lines 22, such as breaking of a grid line 22, shortening or lengthening of a grid line 22, or dis-alignment of a grid line 22, can be analyzed to assess the effectiveness of the suturing procedure.

The deformation of the lines 22 of the grid 20 can include changes in length of a particular line 22, changes in angles between segments of the lines 22, and the orientation of a particular line 22. The length of grid lines 22 across a wound or incision 18 can also be used to determine overlap of the tissue model 12A. The alignment or matching up of grid lines 22 across the wound or incision 18 can be used to assess approximation of the repair of the wound or the incision 18.

In an example, the assessment markings 16 can comprise a three-dimensional volume of the tissue model 12, such as a specific or complex shape. The three-dimensional volume can simulate an unwanted mass of tissue, such as a tumor, non-cancerous growth, or other diseased or damaged tissue that is to be removed by the medical procedure. Conversely, the three-dimensional volume can simulate a portion of tissue that is desired to be kept, such as an organ or healthy tissue surrounding tissue that is to be removed.

Figure 4:
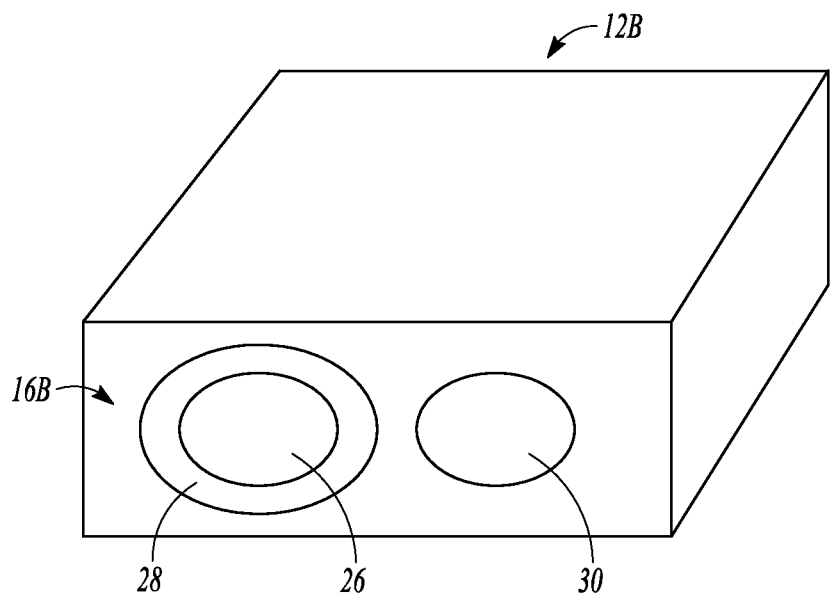
FIG. 4 is a diagram of a tissue sample with three-dimensional assessment indicators applied therein.

FIG. 4 shows an example of a tissue model 12B having one or more assessment markings 16B comprising a volume of the tissue model 12B that can simulate a portion of the tissue model 12B that is to be removed, such as a tumor or an otherwise diseased portion of tissue. The assessment markings 16B can comprise a specified and complex volume 26 of the tissue model 12B. The volume 26 can comprise pigment or dye that is only viewable under a particular wavelength of light, such as the light-sensitive, e.g., UV-sensitive, polymer resins described above, that is blended with the material of the tissue model 12B. The volume 26 can be configured so that it is covered by other portions of the tissue model 12B prior to a medical procedure, where the medical procedure can include removal of the volume 26 by incision, excision, or dissection. If, after the procedure, any portion of the volume 26 is left behind, it can become visible under the particular wavelength that the pigment or dye is sensitive to, such as UV light.

One or more additional volumes can be positioned in or around the first volume 26 in order to further assess the performance of the medical procedure. For example, a second volume 28 can be positioned around the first volume 28, wherein the second volume 28 can include a different pigment or dye, such as a pigment or dye that appears as a different color from the first pigment or dye of the first volume 26 or that appears under a different wavelength of light than the first pigment or dye of the first volume 26. The second volume 28 can be used to determine how much of the tissue surrounding the first volume 26 was left behind, in order to assess the performance of the student or trainee in preserving or maintaining the desired tissue.

A third volume 30 can be positioned proximate to the first volume 26 and the second volume 28 and can simulate a specific tissue, such as an organ, that is to be avoided during the procedure. The third volume 30 can include a third pigment or dye, such as a pigment or dye that appears as a different color from the first pigment or dye of the first volume 26 and from the second pigment or dye of the second volume 28 or that appears under a different wavelength of light than the first pigment or dye of the first volume 26 and the second pigment or dye of the second volume 28.

Returning to FIG. 1, the system 10 can also include a device or means for imaging the assessment markers 16, such as a camera 32. The system 10 can also include a device or means for analyzing the assessment markers 16, for example a processor 34 that can analyze images or video taken by the camera 32. The processor 34 can be one or more processors, such as one or more microprocessors, digital signal processors (DSPs), application specific integrated circuits (ASICs), field programmable gate arrays (FPGAs), programmable logic circuitry, or the like, either alone or in any suitable combination. The processor 34 can be configured via instructions or code, such as microcode, assembly language code, a higher-level language code, or the like. The instructions or code can include computer readable instructions for performing various methods. The instructions or code can form portions of computer program products. The instructions or code can be tangibly stored on a memory 36, such as one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The processor 34 can be configured to analyze images or video captured by the camera 32 in order to assess performance of a particular medical procedure. In an example, the processor 34 is configured to compare one or more images or video captured by the camera 32 to one or more reference images or videos in order to determine a compliance of the present medical procedure to an ideal or desired outcome for the medical procedure.

In an example, one or more images of the tissue model 12 and the assessment markings 16 can be taken during or after the completion of the medical procedure being assessed. FIG. 3 is an example of an assessment image 38 taken of a tissue model 12A and the assessment markings 16A after completion of a suturing procedure. As noted above, the tissue model 12A has been exposed to UV light while the image of FIG. 3 was taken so that the assessment markings 16 are captured in the assessment image 38.

A reference image can be captured or created in order to compare to the image 38. In an example, the reference image can be an image captured after an expert performed substantially the same procedure. In another example, the reference image can be created as a composite or average of a plurality of individual expert results, such as the same or substantially the same procedure being performing by a plurality of experts or an individual expert performing the same procedure a plurality of times, a combination of the two, or based on a consensus conference of experts. The plurality of images can be analyzed and compared, such as by the processor 34, to produce an image average of all the expert images. In another example, for a relatively simple procedure, such as a simple suturing procedure, the reference image can comprise an image of the tissue model 12A and the assessment markings 16 before the procedure has been performed, so that the trainee or student can attempt to maintain the tissue model as close to its "natural" state as possible.

FIG. 2 shows an example of a reference image 40 that comprises the tissue model 12 in its unsutured state before a suturing procedure has been performed. The reference image 40 thus can represent the "before" image of the tissue model 12A, while the assessment image 38 can represent the "after" image taken after the procedure has been completed.

In an example, the assessment image 38 can be compared to the reference image 40 via image processing software that is run by the processor 34. The image processing software can allow the processor 34 to first register the assessment image 38 and the reference image 40, and then to compare registered images 38, 40 to determine a difference between the two images, and, in some examples, to provide an assessment score.

Figure 5:
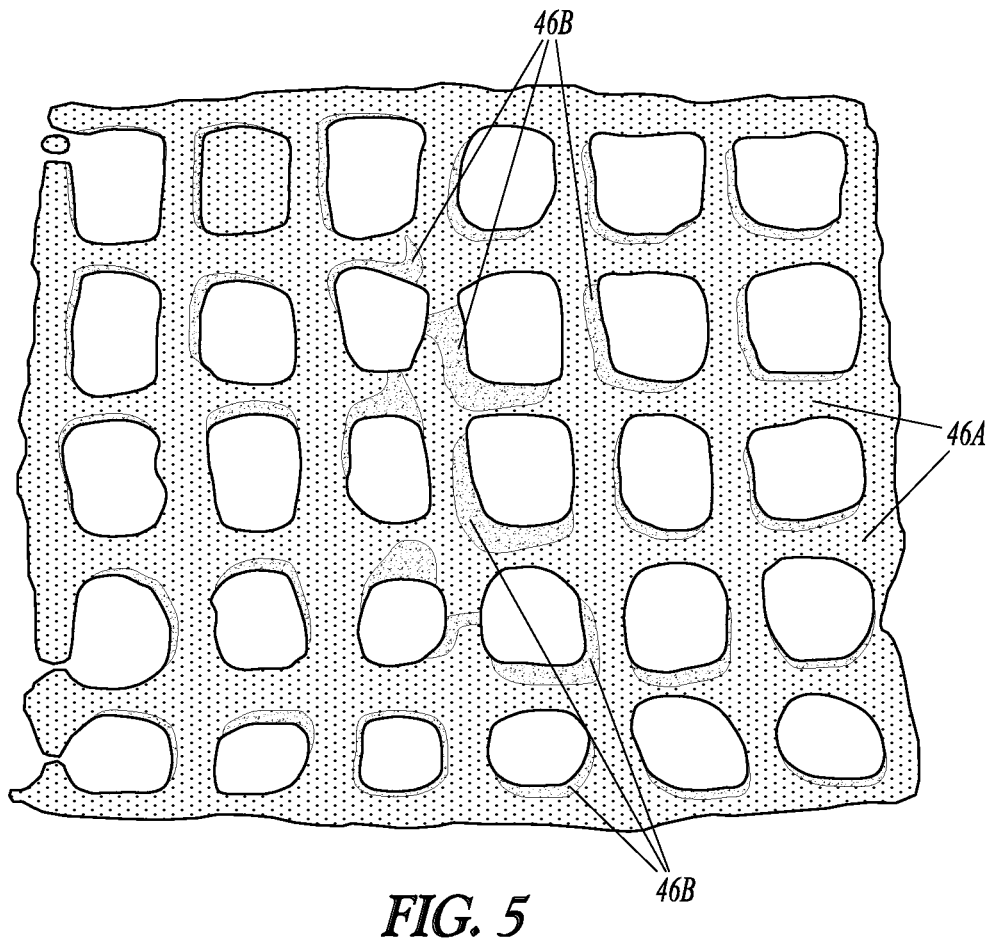
FIG. 5 is a representation of assessment indicators from an assessment image overlaid on top of assessment indicators from a reference image.

The terms "registering," "registered," and "registration," as used herein, can refer to aligning the images 38, 40 to account for any differences in images due to the images 38, 40 being captured under different conditions or camera perspectives, such as different lighting conditions or under different angles or distances of the camera 32 relative to the tissue model 12 when the images 38, 40 were taken. In an example, in addition to the assessment markings 16, the tissue model 12 can also include registration markings 42 that provide reference points to assist the image processing software in registering the assessment image 38 to the reference image 40. As shown in FIGS. 3 and 5, the registration markings 42 can comprise a plurality of registration points that are positioned at specific locations around the assessment markings 16, such as five registration points being substantially evenly spaced around a periphery of the assessment grid 20. The registration markings 42 can be distinguishable from the assessment markings 16A, such as by being configured to appear as a different color, shape, or intensity than the assessment markings 16A, so that the processor 34 and the image processing software can recognize the difference between the assessment markings 16A and the registration markings 42.

The image processing software can translate or otherwise transform the assessment image 38 so that the registration markings 42 in the assessment image 38 are substantially aligned with and are substantially the same size as the registration markings 42 in the reference image 40. Alternatively, the image processing software can translate or otherwise transform the reference image 40 so that the registration markings 42 in the reference image 40 are substantially aligned with and are substantially the same size as the registration markings 42 in the assessment image 38.

After registering the assessment image 38 with the reference image 40, the registered images 38, 40 can be compared by the image processing software to determine the differences between the two images 38, 40. In an example, the assessment image 38 is compared to the reference image 40 by first isolating the gridlines 22 from the assessment image 38 and isolating the gridlines 22 from the reference image 40, and then by overlaying the assessment image gridlines 22 onto the reference image gridlines 22, or vice versa. FIG. 5 shows an example of assessment markings 46A from the assessment image 38 being overlaid on top of assessment markings 46B from the reference image 40. As can be seen in FIG. 5 by the different cross-hatching used to distinguish each set of assessment markings 46A, 46B, much of the reference image assessment markings 46B are matched or substantially matched by the assessment image assessment markings 46A. However, in a few areas, the reference image assessment markings 46B are exposed due to misalignment of the assessment image assessment markings 46A off of the reference image assessment markings 46B. In an example, an image of the assessment image assessment markings 46A overlaid onto the reference image assessment markings 46B, or vice versa, can be displayed to the trainee to provide visual feedback to the trainee regarding the procedure.

The image processing software can be configured to determine an assessment score based on the comparison of the assessment image 38 to the reference image 40 in order to provide a quantitative measure of performance. In an example, the assessment score can be calculated as a percentage of area of overlap between the isolated assessment markings of the assessment image 38, e.g., the gridlines 22A, and the isolated assessment markings of the reference image 40, e.g., the gridlines 22B. Other methods of determining a quantitative assessment score can be used without varying from the scope of the present disclosure. For example, specific areas or location of the assessment markings can be given a weighted score so that overlap of the assessment markings between the assessment image 38 and the reference image 40 in certain areas can result in a higher score than overlap in other areas. Similarly, the weighting of the score can result in a lack of overlap in certain areas, resulting in a lower score, e.g., a larger penalty, than lack of overlap in other areas. Moreover, parameters other than the overlap of the assessment markings between the assessment image 38 and the reference image 40 can be used, such as the amount of overlap at the closure of the wound or incision 18, or approximation of the tissue at the wound or incision 18. In an example, a model of potential outcomes for the assessment markings in the assessment image 38 can be created that determines predicted outcomes, such as healing speed and scar tissue formation, wherein the model can be used to create a quantitative assessment score.

Returning to FIG. 1, the system 10 can also include one or more sensors 46 that are located on or imbedded within the tissue model 12, such as a pressure sensor, a strain gauge, a deformation sensor, or a sensor capable of determining if a plane or location has been breached by an instrument. The sensors 46 can be located at specific locations within the tissue model 12 to provide additional feedback regarding performance of the medical procedure. For example, one or more pressure sensors can be positioned below where a dissection procedure is to be performed to determine if a pressure exerted by the trainee onto the underlying tissue exceeds a desired threshold that might lead to further damage, such as excessive bruising or scarring.

In an example, sensors can be positioned on or between a layer or layers of the tissue model 12 or imbedded within one or more layers of the tissue model 12 for measuring deformation of the tissue model upon contact or collision with objects such as surgical instruments, hands of a medical practitioner or other organs such as bones.

In an example, a piezoelectric film that can detect pressure or deformation can be used, such as the pressure or force sensing films sold by Tekscan, Inc. (South Boston, Mass. USA).

In an example, at least one of a strain gauge, a capacitive diaphragm, an electromagnetic inductance diaphragm, an optical strain detection sensor, a potentiometer mechanism, a vibration sensor, an accelerometer, a dynamic switch element, and a piezoelectric sensor can be positioned on or between or imbedded within any layer of the tissue model. In an example, the sensor can produce a voltage signal in proportion to a compression force, or a tensile mechanical stress or strain. Piezoelectric sensors, such as a piezoelectric film or fabric, can also be well suited for high fidelity tissues with audio in the high frequency (e.g., greater than about 1 kHz) and ultrasound frequency (e.g., up to 100 MHz) ranges, such as for ultrasound detection. Piezoelectric sensors can be in the form of cables, films, sheets, switches, and can be amplified in a laboratory setting.

In an example, a piezoresistive sensor can be used to measure deformation of the tissue model material at a particular location. In an example, a piezoresistive fabric can be imbedded on, within, or between layers of the tissue model to provide contact and deformation detection with minimal delay in response or recovery time (over 400 Hz). A small delay in response or recovery time allows for haptic data of the interactions to be collected and for a dynamic response to be performed.

In an example, EeonTex flexible fabric (also known as e-fabric), sold by Eeonyx Corporation (Pinole, Calif. USA) can be used as a piezoelectric sensor that can conform with three-dimensional surfaces can be used.

In an example, a sensor can be located at an expected collision site. For example, while intubating the airway of an artificial tissue analogue, one or more sensors can be placed in at least one of an artificial tongue, an artificial larynx, an artificial pharynx, artificial vocal cords, and an artificial bronchia because these locations are known as collision sites where damage has occurred by improper technical or procedural technique. In an example, a sensor or sensors can be located near an incision site for the tissue model in order to measure the depth, pressure, and forces (with direction) of any movement of the tissue.

In an example, flow sensors can be imbedded into the tissue in order to measure flow rate, for example of a simulated blood flowing through the tissue model.

In an example, leak testing pressure sensors can be used to send the decay of pressure in a closed-loop artificial artery or vein due to an accidental or purposeful cut, incision, or needle stick of the wall of the model. Quantifying the amount of fluid loss can be associated with blood loss in a patient during procedures, which can be related to outcomes and safety metrics.

Figure 6:
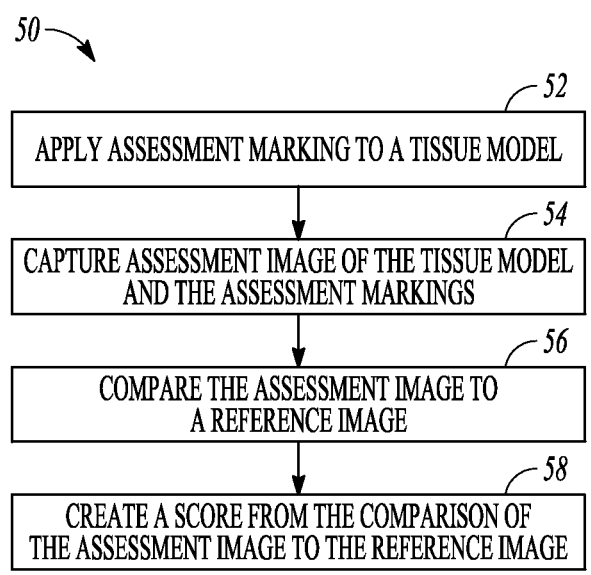
FIG. 6 is flow diagram of an example method of assessing a medical procedure using the example systems of FIGS. 1-5.

FIG. 6 is a flow diagram of an example method 50 of assessing performance of a medical procedure. The method 50 can include, at 52, applying assessment markings to a tissue model, such as the gridlines 22. As described above, the assessment markings can comprise an ink, pigment, or dye that is applied to a layer or a volume of the tissue model. The assessment markings can be configured so that they are undetectable or substantially undetectable, such as by being invisible or substantially invisible, while a procedure is being performed, but that can be made to be detectable after the medical procedure is complete, such as by becoming visible under a specific wavelength of light, such as UV light. At 54, an assessment image or video of the tissue model and the assessment markings can be taken after the procedure has been performed, such as by taking a picture of the tissue model while it is being exposed to UV light so that the assessment markings are visible in the captured image. At 56, the assessment image or video can be compared to a reference image or video. At 58, a score can be created from the comparison of the assessment image or video to the reference image or video. The score can be a quantitative score based on one or more measurable differences between the assessment image and the reference image, such as a percentage of overlap area between the assessment image and the reference image. The score can also be provided by comparing the assessment image to a simulation model of the tissue that can estimate tissue outcomes, such as scarring or other tissue damage.

Figure 7A:
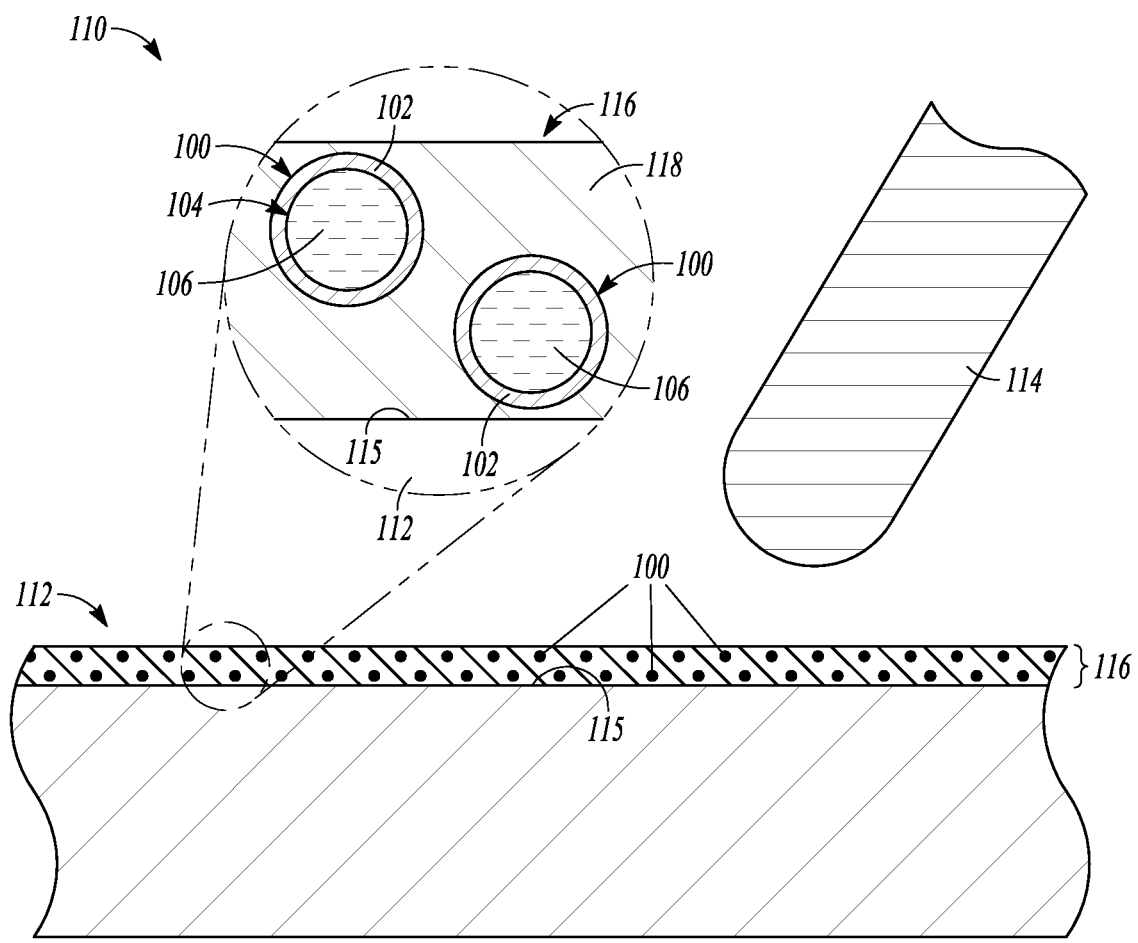
FIG. 7A is a diagram of an example tissue model including a film comprising dye-impregnated capsules that release the dye at a specific applied pressure.
Figure 7B:
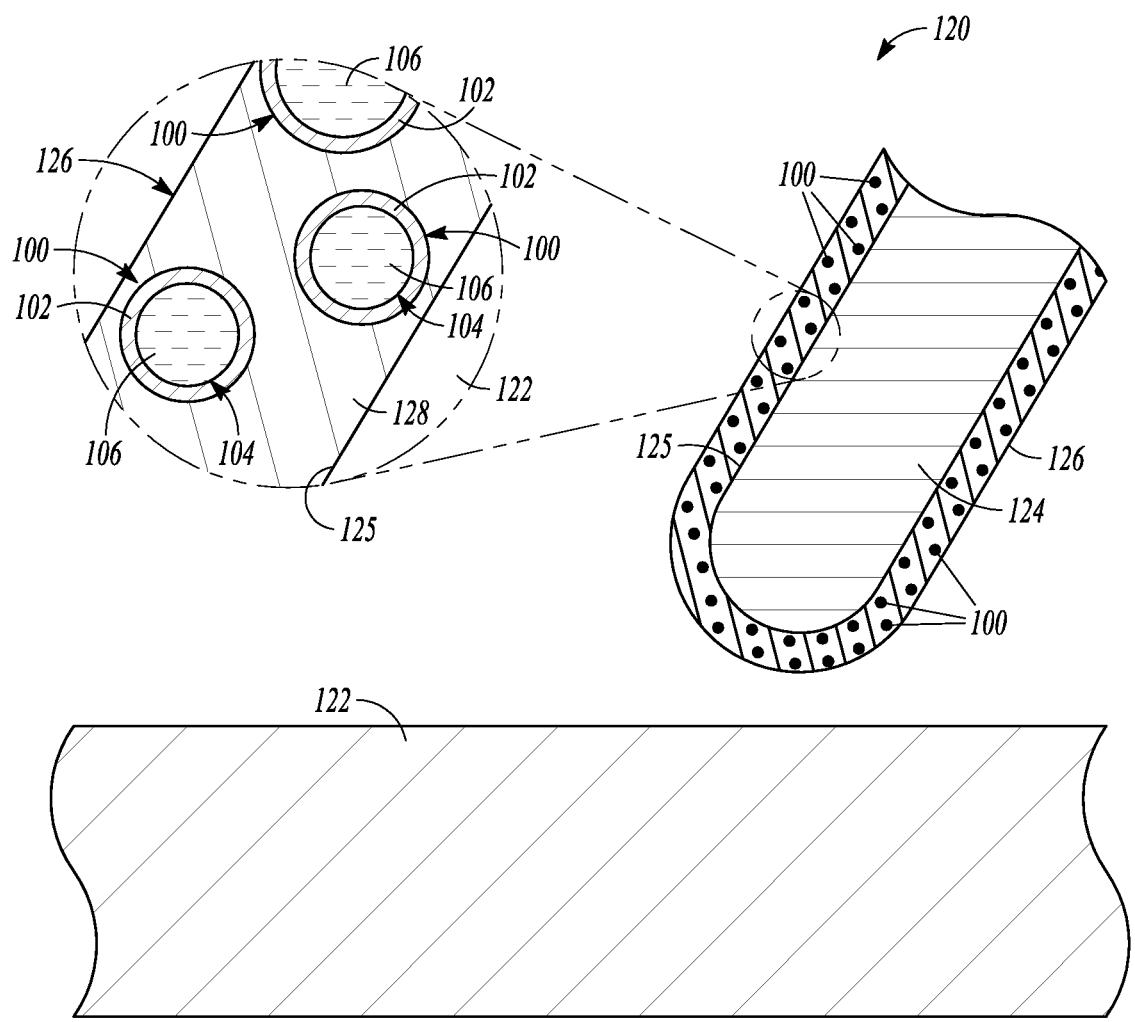
FIG. 7B is a diagram of an example tissue model system including a tool to be used on the tissue model during a medical procedure, the tool including a film comprising dye-impregnated capsules that release the dye at a specific applied pressure.
Figure 7C:
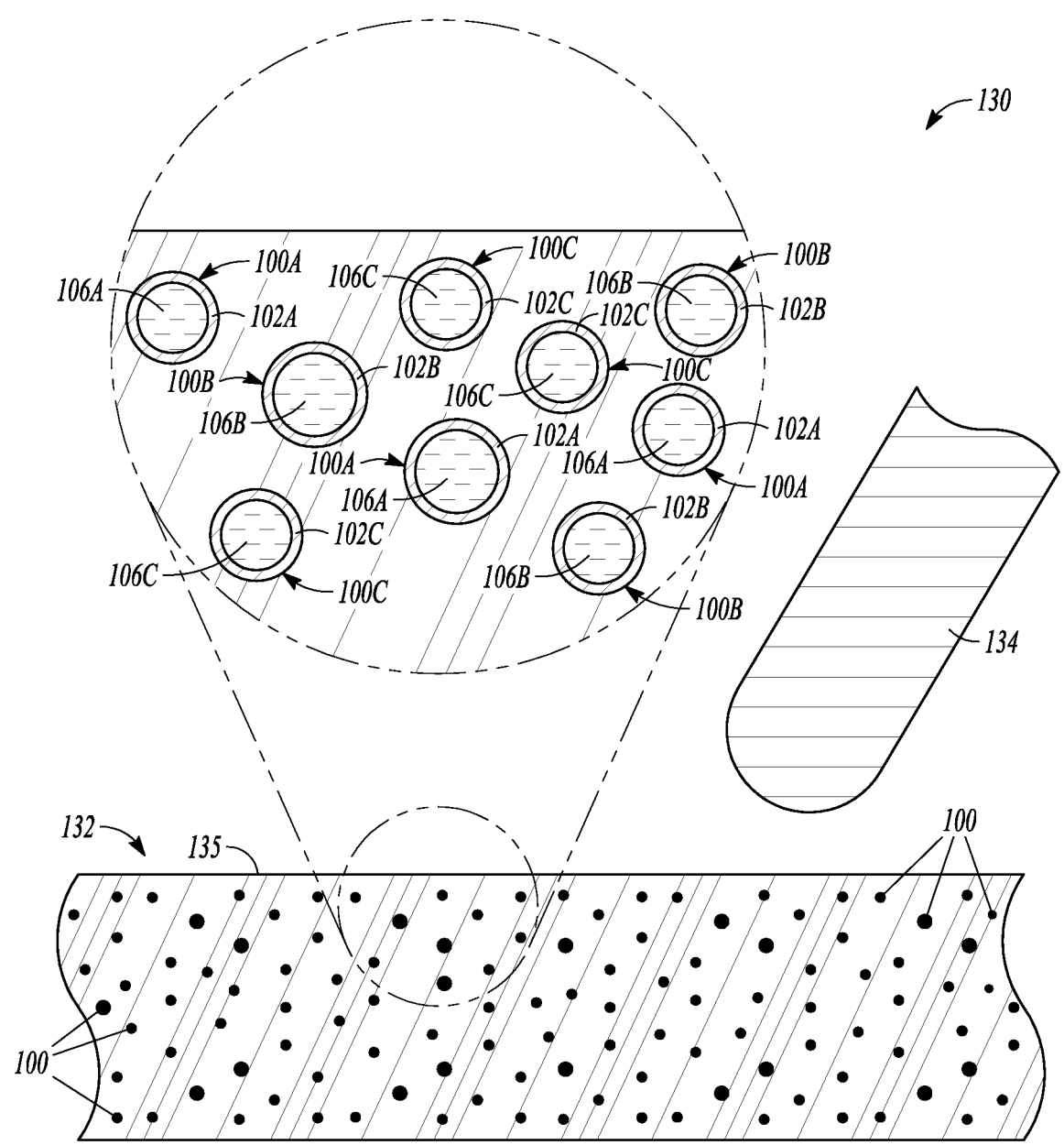
FIG. 7C is a diagram of an example tissue model including an additive to the tissue model material, the additive including dye-impregnated capsules that release the dye at a specific applied pressure.

FIGS. 7A, 7B, and 7C each shows further examples of tissue model systems that can be used to assess performance during a medical procedure or a medical procedure being performed on a tissue model. Each of FIGS. 7A-7C includes the use of assessment indicators comprising impregnated capsules on or within the tissue model, or on a tool that is being used on the tissue model during the medical procedure. The impregnated capsules may contain one or more materials (such as one or more dyes, one or more chemicals, one or more metals, one or more pH indicators, or one or more elements or other materials) that can respond to an external stimulus. The impregnated capsules can be configured to expose or activate the material impregnated within the capsule when the capsules are exposed to the external stimulus above a predetermined stimulus threshold. The material impregnated within the capsule can be configured to be detectable under predetermined conditions (e.g., to become visible once exposed, or to be visible or otherwise detectable under specified conditions, such as when a particular temperature, light, or chemical is applied to the material). Thus, the capsules can be used to determine if and when a particular stimulus threshold has been exceeded.

For example, the capsule can be configured to release a dye material when a pressure applied to the capsules is beyond a predetermined pressure threshold, such as by being breached or bursting. Alternatively, the capsules can be configured to release or expose the material when exposed to other stimuli, such as:

(a) a predetermined heat source, e.g., so that the capsules burst or expose the material when a particular temperature is reached;
(b) light source, e.g., so that the capsules burst or release the material when a particular wavelength of light is incident upon the capsules. A structure of the capsules can also be configured to be transparent or substantially transparent to a particular wavelength of light, and the material within the capsule can be activated by the same wavelength of light.
(c) chemical source, e.g., so that a portion of the capsules chemically reacts with a particular chemical species to release or expose the material. The capsule can also be configured so that the chemically-reacting portion of the capsule reacts to form the material. The capsule can also be configured to be permeable to certain chemical species to pass into the capsule and interact with the material to produce a change in the material, such as a color change.
(d) electromagnetic source, e.g., so that a particular current, charge, voltage, or electromagnetic field will cause the capsule to expose or release the material. The electromagnetic source can also direction act on the material to provide a change. For example, if a metal or other magnetizable material is impregnated within the capsules, the magnetizable material can be configured to change orientation when exposed to a particular electromagnetic field. The change in orientation can be detected in much the same way that a computer hard drive is read.

The activation or exposure of the material thus can provide an indication that the particular stimuli threshold has been reached. The indication can be visual or detectable via other means. The indication can also be temporary, reversible, or permanent. The encapsulated materials can also act as biomimetic chromatophores to indicate things like bruising, changes in physiology, and the like.

As described in more detail below, the capsules can be deployed on a surface of the tissue model or the tool being applied to the tissue module, or within the tissue model. Each capsule 100 can include an outer casing 102 that surrounds and encloses a cavity 104. The casing itself can be an active component containing any of the above materials and react with the internal materials or to the external stimuli. The cavity 104 can hold an indicator material, such as a dye 106. For the purposes of brevity, the remainder of this description will describe capsules 100 enclosing one or more dyes 106. However, it will be appreciated by a person of ordinary skill in the art that other materials can be sued, as described above.

The casing 102 can be configured to release the dye 106 from the cavity 104 after a specified threshold is applied to the casing 102, such as a particular pressure, temperature, light, electromagnetic, or chemical energy source. For example, the casing 102 can be configured so that it is breached, e.g., by cracking or fracturing, at a specified pressure threshold.

In another example, the casing 102 can be configured to be permeable to the dye 106, but only above a specified threshold of the dye 106 within the cavity 104. When the specified threshold is applied to the casing 102, the casing 102 can become permeable to the dye 106 and the dye 106 can be released through the casing 102.

In another example, the casing 102 of the capsule 100 can include a porous structure that can absorb and hold the dye 106, similar to a sponge. The porous structure of the casing 102 can be such that the dye 106 is not released from the porous structure until the specified threshold is applied to the capsule 100. Alternatively, rather than having a film-like casing, the capsule 100 can comprise the porous structure substantially throughout the entire structure of the capsule 100.

In yet another example, the casing 102 can divide the capsule 100 into a plurality of compartments, with each compartment containing a different color constituent. Each of the color constituents, by itself, can be transparent or substantially transparent. However, when the color constituents mix together, a color change can occur so that the dye 106 can be formed. When the specified threshold is reached, one or more portions of the casing 102 can allow a first color constituent to mix with one or more additional color constituents to enact a color change so that a colored dye 106 is formed. As demonstrated above, other mechanisms for the release or exposure of the material within the capsule can be envisioned by a person of ordinary skill in the art.

The capsules 100 can be configured so that they will be unapparent to a user before the specified threshold is applied to the capsules 100. For example, the material of the casing 102 can be such that the capsules 100 appear to blend in with the material on which the capsules 100 are applied. For example, if the capsules 100 are being used on a tissue model that is simulating a particular type of tissue, the casing 102 of the capsules 100 can have a color that substantially matches the color of the tissue being simulated. In the example described above where a plurality of color constituents are separated by the casing 102 until the specified pressure threshold is applied, the casing 102 and the color constituents can be transparent or substantially transparent. In this example, the capsules 100 can appear to be substantially invisible to the user until the specified threshold is reached and the capsule 100 allows the color constituents to mix.

The capsules 100 can also be unapparent by having a size that would be difficult or impossible for the human eye to distinguish. In an example, the capsules can have a size in a length direction (e.g., a diameter) of from about _100 μm to about _1 cm_. Depending on the size of the capsules 100, the density of capsules 100 at the portion of the tissue model to be analyzed (e.g., the number of capsules 100 or the weight of capsules 100 per unit area or unit volume) can be selected so that when the specified threshold is applied to the tissue model, the capsules 100 will release a sufficient amount of the dye 106 to be detectable.

The capsules 100 can also be configured to release different dyes at different thresholds to provide for tiered evaluation of the force or pressure being applied to a tissue model. For example, as shown in FIG. 7C, a first subset of the capsules 100A can include a first dye 106A and can be configured to release the first dye 106A at a first threshold, e.g., a lower pressure threshold. A second subset of the capsules 100B can include a second dye 106B and can be configured to release the second dye 106B at a second threshold, e.g., a middle pressure threshold. A third subset of the capsules 100C can include a third dye 106C and can be configured to release the third dye 106C at a third threshold, e.g., a higher pressure threshold. The different thresholds can be achieved with each type of capsule 100A, 100B, 100C, for example, by using different materials for the casing 102A, 102B, 102C of each type of capsule 100A, 100B, 100C that will rupture at the different thresholds. Similarly, the casings 102A, 102B, 102C can be formed with different thicknesses, or can be formed to be permeable to the dye 106A, 106B, 106C at different stimuli intensities.

T differed capsules 100A, 100B, 100C can also include different materials that will be distinguishable when detected. For example, the first dye 106A can comprise a green dye and the first capsules 100A can be configured to release the first dye 106A when a relatively small stimulus (e.g., a low pressure) is applied to the tissue model in order to indicate that contact with the tissue model has been made. The second dye 106B can comprise a yellow dye and the second capsules 100B can be configured to release the second dye 106B when the applied stimulus is above a specified "warning" value at which tissue damage of the tissue being simulated by the tissue model can begin to occur (e.g., above an intermediate "warning" pressure threshold). The third dye 106C can comprise a red dye and the third capsules 100C can be configured to release the third dye 106C when the applied stimulus is above a threshold where the tissue being simulated is certain or substantially certain to be damaged (e.g., above a predetermined maximum allowable pressure). A larger or smaller number of thresholds can be detected using capsules 100 of different configurations and materials.

As described so far, the dye 106 within the capsules can be visible or can be configured to become visible when the specified pressure threshold is applied to the capsules 100. Visible dye 106 can provide direct feedback to a trainee to know when and where excessive pressure was applied to the tissue model. However, the dye 106 can be configured to be invisible, substantially invisible, or substantially visually unapparent to a user under normal light even after the dye 106 has been released from the capsules 100. The released dye 106 can comprise a latently detectable material, such as a dye that is only visible or otherwise detectable under specific conditions. For example, the released dye 106 can then be made to become visible only when illuminated under light having a specific wavelength or range of wavelengths, such as ultraviolet (UV) light. The dye 106 can then be made to be visible to a trainee or an evaluator after completion of the medical procedure.

The released dye 106 from the capsules 100 can comprise a material that is sensitive to a particular wavelength or range of wavelengths of light. In an example, the dye 106 can include an ultraviolet light sensitive material that fluoresces when the UV-sensitive material is exposed to UV light. For the sake of brevity, the dye 106 will be described as including a UV-sensitive indicator material. However, a person of ordinary skill in the art can appreciate that materials sensitive to other wavelengths of light, such as infrared light, can be used.

While performing a specified task, such as a medical procedure, a user (e.g., a trainee) can be unaware that the dye 106 has been released from the capsules 100 due to the transparent nature of the dye 106 under normal light. Following completion of a task by the user, an evaluation of his or her ability to perform the task can be made by exposing the tissue model to UV light, where the UV-sensitive dye 106, if exposed, will fluoresce, revealing that the dye 106 has been released (which can indicate that the user applied force or pressure beyond the specified pressure threshold).

As noted above, different capsules 100A, 100B, 100C (FIG. 7C) can be configured with different colored dyes 106A, 106B, 106C. Similarly, if an initially invisible or substantially invisible, UV-sensitive dye 106 is used, different capsules 100 can be configured to fluoresce in more than one color when exposed to UV light. As described above, the different capsules 100A, 100B, 100C can indicate different applied thresholds. The different capsules 100A, 100B, 100C with different colored dyes 106A, 106B, 106C can also be applied to different positions on or within the tissue model, such as to indicate a first area where a particular stimulus is acceptable, and other areas where the same stimulus would be unacceptable.

The capsules 100 can be applied to desired locations of the tissue model or tools by any method that accurately and reliably places the capsules 100. FIGS. 7A-7C show three examples of configurations for the deployment of the capsules 100. The subject matter of the present description is not limited to these particular examples, and the capsules 100 of the present description can be implemented in other configurations or structures.

FIG. 7A is a diagram of an example of a system 110 including a tissue model 112 and a tool 114 being used on the tissue model 112. The tool 114 can be any tool that can be used for a simulated medical procedure, including, but not limited to, a cannula, a catheter, a curette, a dilator, a dissecting tool, forceps, a hemostat, a laparoscopic tool, a retractor, a scalpel or other cutting tool, a speculum, an endoscope or other endoscopic tool, a suction tube, a surgical clamp, a surgical elevator, a suture and a needle for preparing a suture, a tracheotomy tool such as a tracheotomy tube, and a trocar. The tissue model 112 includes a film 116 deposited or formed on an upper surface 115 of the tissue model 112. The film 116 includes the capsules 100 dispersed throughout, wherein the capsules 100 are configured to release or expose a material, such as a dye 106, when a predetermined stimulus threshold is applied to the capsules 100, as described above.

FIG. 7B is a diagram of another example system 120 including an example tissue model 122 and a tool 124. Similar to the tissue model 112 and the tool 114 described above with respect to FIG. 7A, the tool 124 can be used to simulate a medical procedure on the tissue model 122. The tool 124 can be any tool that can be used for a simulated medical procedure, including, but not limited to the examples of tools listed above with respect to tool 114 in FIG. 7A. The system 120 also includes a film 126 comprising capsules 100 that release dye 106 when a predetermined stimulus threshold is applied to the capsules 100. However, rather than being applied to a surface of the tissue model, as with the film 116 in FIG. 7A, the film 126 in FIG. 7B is applied to a surface 125 of the tool 124.

In an example, the film 116 of FIG. 7A or the film 126 of FIG. 7B can be in the form of a pre-formed film that is applied to the surface 115, 125 upon which the film 116, 126 is to be positioned. The film 116, 126 can be adhered or otherwise attached to the surface 115, 125, such as with a pressure-sensitive adhesive, a bonding adhesive, or one or more fasteners, or the film 116, 126 can be allowed to rest on the surface 115, 125 with gravity holding the film 116, 126 in place. The preformed film 116, 126 can comprise a solid or substantially solid base material 118 (in the film 116 of FIG. 7A) or base material 128 (in the film 126 of FIG. 7B) that holds the capsules 100 in place within a three-dimensional structure. The base material 118, 128 can comprise any material that provides for a satisfactory feel for the user. An example of a material of the base material 118, 128 that can be used is a polymeric material, such as a polyester-based, urethane-based, or polyurethane-based polymer. An example of a pre-formed film that can be used as the film 116, 126 in FIG. 7A is a low-pressure pressure-indicating film sold by Pressure Metrics LLC, Whitehouse Station, N.J., USA, such as the Fujifilm Prescale 4LW (Extreme Low Pressure) film.

In another example, the film 116 of FIG. 7A or the film 126 of FIG. 7B can be applied in the form of a paint-like coating that can be coated onto the surface 115, 125 by a liquid-coating technique, such as brushing on, dip coating, spin coating, and the like. The coating can include the capsules 100 suspended in a liquid precursor such that the liquid precursor can be applied by the desired liquid-coating technique. The liquid precursor can be configured to solidify to form a solid or substantially solid base material 118, 128 that supports the capsules 100 in place. An example of a coating material that can be applied to the surface 115, 125 to form the film 116, 126 are powder-based pressure-sensitive capsules deployed in a paintable coating of silicon adhesive sold by Luna Innovations Inc., Roanoke, Va., USA.

FIG. 7C is a diagram of another example system 130 including a tissue model 132 and a tool 134. However, rather than incorporating capsules 100 in the form of a film 116, 126, the tissue model 132 includes capsules 100A, 100B, 100C (collectively referred to herein as "capsules 100") as an additive of the tissue model 132 itself. For example, as described in further detail below, the tissue model 132 can be formed from an organosilicate base that can include additive, wherein the capsules 100 can be an additive that is included in the organosilicate base. The capsules 100 can be blended with the organosilicate base material of the tissue model 132 prior to setting the organosilicate-based material into a solid or substantially solid form. In an example, at least a portion of the base material of the tissue model 132 can be transparent or translucent to the particular wavelength of light or range of wavelengths being reflected by the released dye 106A, 106B, 106C (collectively referred to herein as "dye 106") from the capsules 100 (or by the wavelength of UV light that the tissue model 132 is exposed to and the wavelength of light that the dye 106 fluoresces at, if an initially transparent or substantially transparent UV-sensitive dye 106 is used). The transparence or translucency to the relevant wave length of light of the dye 106 can allow for detection of dye 106 that is released internally within the tissue model 132, but that would not necessarily be visible at an outer surface 135 of the tissue model 132.

The tissue model system can include visual inspection and analysis equipment such as a camera or scanner coupled to a processor that can analyze the tissue model and any released or exposed material, such as a dye 106. For example, the camera or scanner can be coupled to one or more processors, such as one or more microprocessors, digital signal processors (DSPs), application specific integrated circuits (ASICs), field programmable gate arrays (FPGAs), programmable logic circuitry, or the like, either alone or in any suitable combination. The one or more processors can be configured to analyze an assessment image or video captured by the camera or scanner in order to assess performance of a particular medical procedure. The one or more processors can then provide feedback to a user regarding performance of the medical procedure. The feedback can be formative (e.g., training or teaching for improvement of the user) or summative (e.g., a test or other evaluation) in nature.

In an example, the one or more processors are configured to compare one or more images or video captured by the camera or scanner to one or more reference images or videos in order to determine a compliance of the present medical procedure to an ideal or desired outcome for the medical procedure. In an example, the reference image or video can be a predetermined color map that can be accessed by the processor to compare to the actual location of released dye 106 detected by the camera. The color map can include the location of capsules 100, the colors at particular locations, and the meaning of particular colors (e.g., if particular colors refer to a particular stimulus threshold).

The assessment image can be compared to the reference image via image processing software that is run by the one or more processors. The image processing software can allow the processor to first register the assessment image and the reference image, and then to compare registered images to determine a difference between the two images, and, in some examples, to provide an assessment score. Image analysis can be used to provide for an inexpensive and automated means of quantifying tissue interaction measures such as peak pressure, mean pressure, or cumulative area of crushed or otherwise damaged tissue.

The image processing software can be configured to determine an assessment score based on the comparison of the assessment image to the reference image in order to provide a quantitative measure of performance. In an example, the assessment score can be calculated as a percentage of the area occupied by the capsules 100 that releases or exposes the impregnated material or materials, e.g., the dye or dyes 106. Other methods of determining a quantitative assessment score can be used without varying from the scope of the present disclosure. For example, specific areas or location of the assessment indicators can be given a weighted score so that release of dye 106 in certain areas can result in a lower score, e.g., a larger penalty, than in other areas. Similarly, the weighting of the score can result in a lack of released dye 106 in certain areas resulting in a higher score, e.g., a bonus, than in other areas. Moreover, the use of capsules 100 configured to release dye 106 at one or more predetermined stimulus thresholds can be combined with other analysis methods, such as the uses of assessment indicators described above with respect to FIGS. 1-6, or the use of optical recording of the tissue model as described below with respect to FIGS. 9-12.

The use of capsules 100, such as in one of the configurations shown in FIGS. 7A-7C, can provide several benefits over other methods for evaluation of stimuli being applied on a tissue model. First, the use of capsules 100 can be relatively inexpensive and relatively easy to implement. For example, the film 116, 126 of FIGS. 7A and 7B on a surface 115 of the tissue model 112 or a surface 125 of the tool 124 can be implemented using a relatively inexpensive preformed film or a liquid precursor to form the film 116 rather than the use of more expensive electrical or mechanical sensors. Similarly, the visual inspection and analysis described above can be incorporated into the same camera and visual analysis processing system described above with respect to the system 10 of FIGS. 1-5. Second, the use of capsules 100 can allow the tissue model 112, 122, 132 to be designed with no electrical sensors or mechanical sensors being present on or within the tissue model 112, 122, 132. Placing any electrical or mechanical components, devices, or systems within a tissue model that is to be used to simulate real, live tissue can cause the tissue model to react unrealistically. Also, it can be difficult to design a tissue model to react realistically to applied forces while electrical or mechanical devices or systems are present, including electrical or mechanical components themselves, along with supporting wires, power sources, or heat sources. Therefore, the capsules 100 can allow the tissue model 112, 122, 132 to be a more faithful and higher fidelity model for actual living tissue, which does not include the physical structures of electrical sensors or mechanical sensors. Therefore, the tissue model 112, 122, 132 incorporating capsules 100 configured to release dye 106 at a prescribed stimulus threshold can provide for a more realistic simulation experience for the user.

Figure 8:
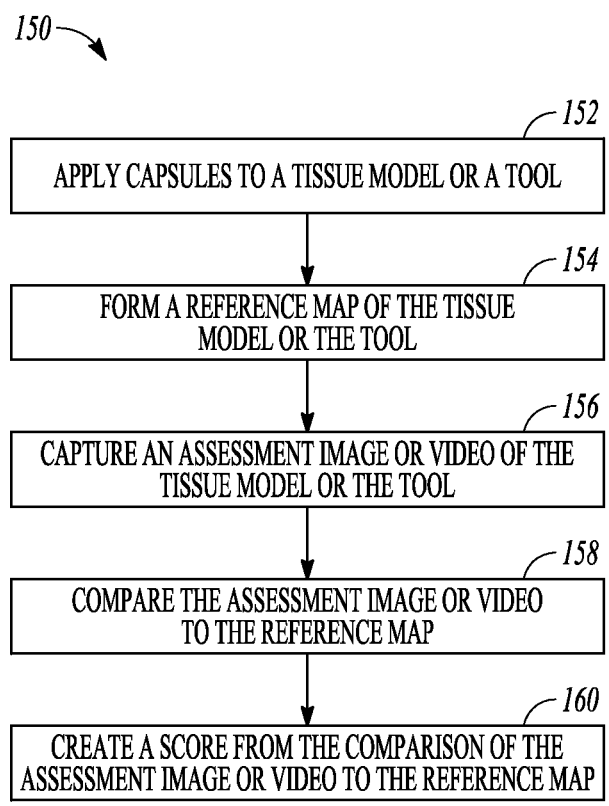
FIG. 8 is a flow diagram of an example method for assessing a medical procedure using the example systems of FIGS. 7A-7C.

FIG. 8 is a flow diagram of an example method 150 of assessing performance of a medical procedure. The method 150 can include, at 152, applying capsules configured to release dye at a predetermined stimulus threshold, such as capsules 100 containing dye 106, to a tissue model or a tool. As described above, the capsules can be applied as a film on a surface of the tissue model or the tool, or both, or the capsules can be incorporated into the tissue model or tool, such as by being dispersed as an additive in the material that forms the tissue model or the tool. In one example, a film comprising the capsules can be deposited or formed on the surface of the tissue model or on the surface of the tool. As described above, depositing or forming the film can include pre-forming the film and then placing, and optionally adhering or fastening the pre-formed film to the surface of the tissue model or the tool. Alternatively, as described above, depositing or forming the film can include applying a coating material including the capsules to the surface of the tissue model or the tool—for example via a liquid coating method such as painting, spin coating, or dip coating—wherein the coating material can then form a solid or substantially solid film that includes the capsules. In another example, the capsules can be incorporated into an interior of the tissue model or the tool, such as by being included as an additive to the material base prior to setting or solidifying the material base to form the tissue model or the tool.

At 154, a reference map, such as a color map, tissue of the tissue model or the tool can be formed. As described above, the map can include the location of capsules 100, the colors at particular locations, and the meaning of particular colors (e.g., if particular colors refer to a particular stimulus threshold).

At 156, an assessment image or video of the tissue model or the tool can be taken during or after performance of the medical procedure, such as by taking a picture or video of the tissue model or the tool so that the location of released or exposed material can be captured. If the material in the capsules comprises initially invisible or substantially invisible but UV-sensitive dye, then the picture or video can be captured while the tissue model or the tool is being exposed to a particular wavelength of light or range of wavelengths, such as UV light, so that the released material is visible in the captured image or video. The assessment image or video can be analyzed, such as by comparing to a reference, such as a reference map, at 158, and creating a score from the comparison of the assessment image or video to the reference, at 160. The score can be a quantitative score based on one or more measurable differences between the assessment image and the reference image, such as a percentage of the dye released from the capsules. The score can also be provided by comparing the assessment image to a simulation model of the tissue that can estimate tissue outcomes, such as scarring or other tissue damage that would be expected based on the location and character of the dye released.

Figure 9:
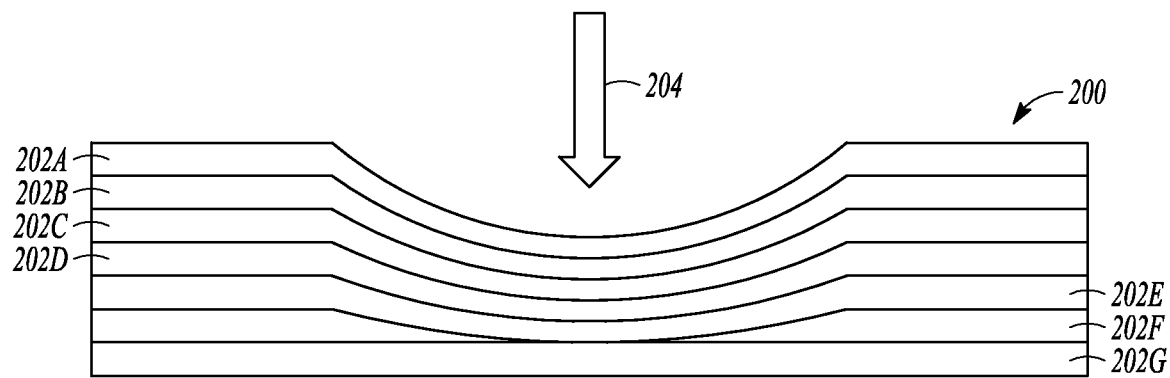
FIG. 9 is a diagram of an example deformation of an example tissue model.
Figure 10:
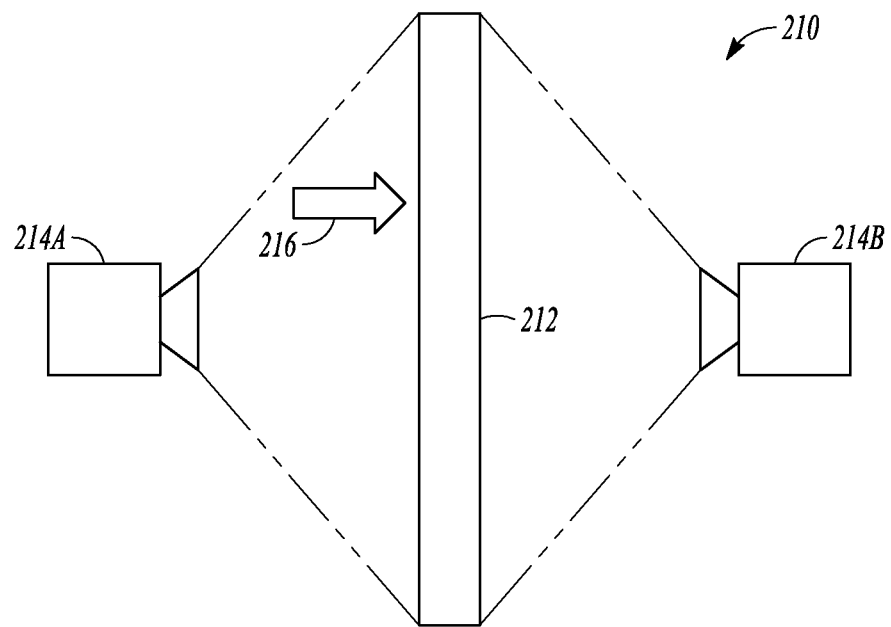
FIG. 10 is a diagram of an example tissue model system for analyzing the pressure or force being applied to a single-layer tissue model.

FIGS. 9-11 demonstrate example systems for measuring deformation and force exerted on a tissue model and for measuring pressure within the tissue model. The systems can provide for optical inspection and analysis of the deformation of a tissue model under an applied force to provide for real-time measurement of the deformation and movement of the structures that form the tissue model.

FIG. 9 shows a side view of an example tissue model 200 that is configured for use with the optical measurement systems described below. The tissue model 200 includes a plurality of layers 202A, 202B, 202C, 202D, 202E, 202F, 202G (collectively referred to herein as "layers 202"). The tissue model 200 can be designed with one or more physical properties that are highly representative of the same physical properties of a live tissue that is to be simulated by the tissue model. For example, the tissue model 200 can be designed to simulate a particular human tissue (such as an abdominal wall tissue) by substantially matching mechanical properties (such as viscoelastic properties, nanoindentive properties, strain rate insensitivity, compressibility, stress-strain curves, Young's modulus, yield stress, tear point, deformability, and the like), electroconductive properties, thermoconductive properties, optical properties, chemical properties, and anisotropic properties of the native tissue.

Because the tissue model 200 can be designed to be a high-fidelity representation of the properties listed above, the mechanical properties of the tissue model 200 are known. The known mechanical properties of the tissue can be used to calculate an external force 204 being exerted on the tissue model 200 based on the deformation that the tissue model 200 experiences upon exertion of the force 204. The calculated force and the observed deformation can also be used to determine the internal pressure that is being experienced by the tissue model 200.

For example, the applied force 204 in FIG. 9 can be calculated based on one or more of the known mechanical properties of the tissue model 200. Moreover, because the mechanical properties can also be known for each of the layers 202 that make up the tissue model 200, a profile of the force vectors showing the force profile throughout each of the layers 202 can be determined based on the observed displacement of the layers 202.

At least one or more of the layers 202 can be made from a transparent or substantially transparent material to allow light propagation through the transparent or substantially transparent layers 202. The tissue model 200 can be viewed and recorded by one or more optical devices, such as a machine-vision like camera, in order to view the deformation of the tissue model 200, and specifically the deformation of each layer 202 relative to the other layers 202. The optical device can view the deformation because of the transparent or substantially transparent material of one or more of the layers 202, which allows for transmission of light from the layers 202. The field of view of the optical device or devices can be calibrated prior to use of the tissue model 200 in order to establish sufficient resolution, such as down to millimeter or even sub-millimeter resolution.

FIG. 10 shows an example of a simplified system 210 that can be configured to analyze displacement of a tissue model 212. The example tissue model 212 in FIG. 10 comprises a single layer, rather than the multiple layers 202 in the tissue model 200 of FIG. 9. The single-layer tissue model 212 can simulate a simple tissue, such as the tissue of a blood vessel. The system 210 can include one or more cameras 214A, 214B (collectively "cameras 214" or "camera 214") on each side of the single-layer tissue model 212. The first camera 214A on the first side of the tissue model 212 can provide for deformation, force, and pressure measurements in one axis (with the measurements being relatively generalized). The second camera 214B on the second side of the tissue model 212 can provide the same information in another plane offset by the thickness of the tissue model 212. The offset nature of the images captured by each camera 214A, 214B provides different perspectives on the deformation of the single-layer tissue model 212 in response to a deformation force 216 to provide for more accurate measurement of deformation. Alternatively, a single camera can be placed looking down an edge of the single-layer tissue model 212 (not shown) to view the deformation from the side.

Figure 11A:
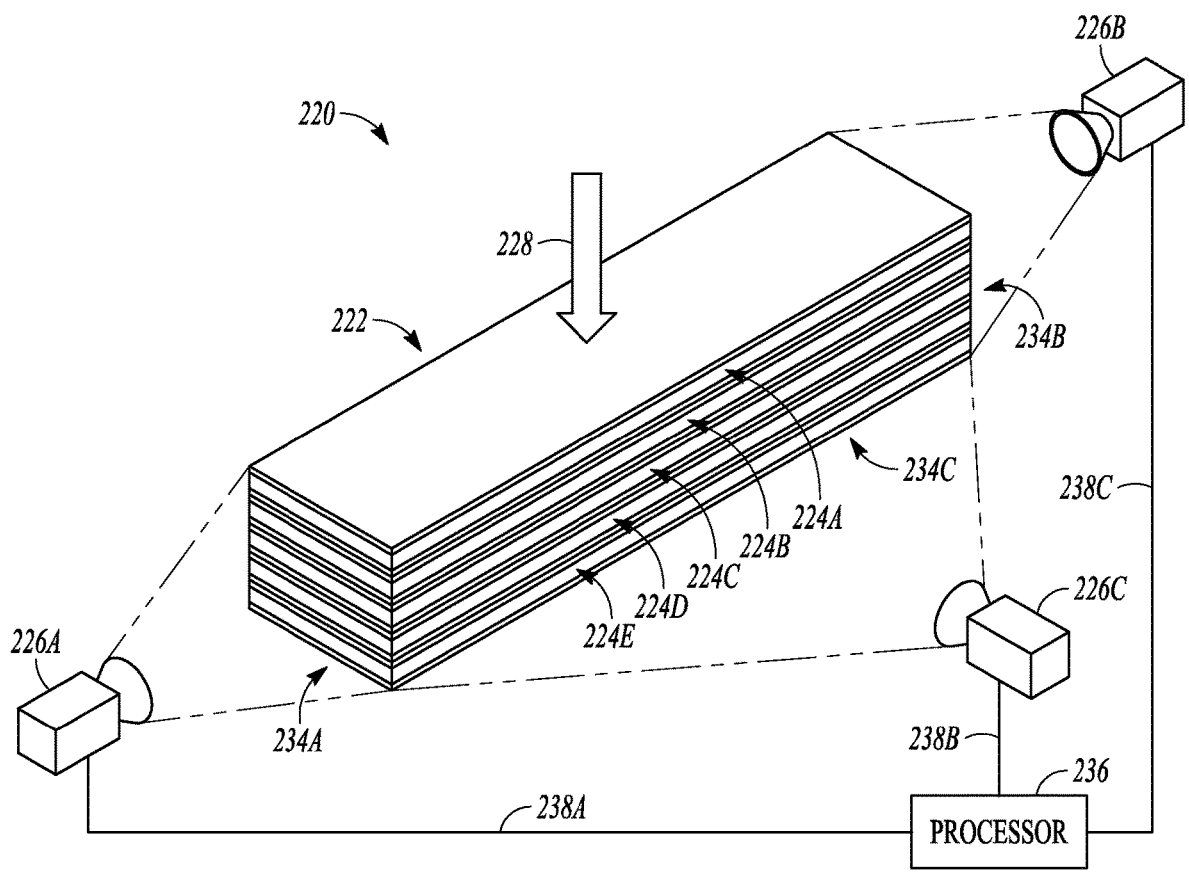
FIG. 11A is a diagram of an example tissue model system for analyzing the pressure or force being applied to a multi-layer tissue model.
Figure 11B:
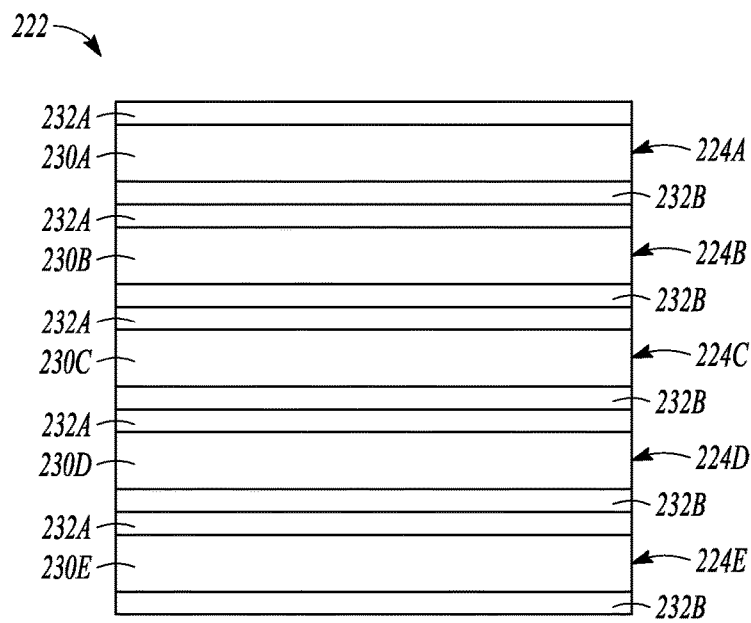
FIG. 11B is a close side view of the example multi-layer tissue model of FIG. 11A.

FIG. 11A shows an example of another system 220 that can be configured to analyze displacement of a tissue model 222. FIG. 11B shows a close-up side view of the tissue model 222. Like the tissue model 200 of FIG. 9, the tissue model 222 of FIGS. 11A and 11B comprises a plurality of layers 224A, 224B, 224C, 224D, 224E (collectively "layers 224" or "layer 224"). A set of one or more cameras 226A, 226B, 226C (collectively "cameras 226" or "camera 226") can be directed toward the tissue model 222 in order to view the deformation of the tissue model 222 and the tissue model layers 224 as a result of an applied force 228, such as a force applied from a tool.

As shown in FIG. 11B, each tissue model layer 224 can comprise a base medium 230A, 230B, 230C, 230D, 230E (collectively "base media 230" or "base medium 230") with an upper film 232A, 232B, 232C, 232D, 232E (collectively "upper films 232" or "upper film 232") deposited on a corresponding base medium 230. In an example, each upper film 232 is opaque. Each upper film 232 can be a different color so that the cameras 226 can be configured to more readily distinguish each particular layer 224. In an example, the base media 230 can be transparent or substantially transparent so that the different wavelengths of light corresponding to the different colors of the upper films 232 will be transmitted through the base media 230. The different colors of the upper films 232 and the transparent or substantially transparent nature of the base media 230 can allow the cameras 226 to separately identify each specific layer 224, and thus to distinguish and determine the deformation of each specific layer 224. The different colors from the deformation planes of the tissue model 222 can provide for a matrix of spectral planes and resolve multiple planes and detail from the third axis (e.g., up and down through the tissue model 222 in FIGS. 11A and 11B). The number of planes (e.g., the number of different wavelengths of emanating light created by different colors) and how the light is affected by the tissue model 222 can determine the special resolution.

In an example, the base media 230 and the upper films 232 can be configured so that the overall tissue model 222 has mechanical properties that match or substantially match corresponding mechanical properties of live tissue, such as human tissue, as described in more detail below. The base media 230 and the upper films 232 can also have optical properties that are conducive to optical inspection for deformation measurement and force calculation, such as base media 230 that is sufficiently transparent to the light wavelengths being transmitted through the tissue model 222 to the cameras 226, and upper films 232 that are sufficiently visible and conspicuous to be detected by the cameras 226.

Additionally, the tissue model 222 can be configured so that one or more of the layers 224 can be in the form of a lattice structure rather than fully solid layers. For example, a three-dimensional printer (described in more detail below) can be used to deposit each layer 224, and one or more layers can be deposited in a lattice form. The lattice structures can allow for additional optical properties, such as allowing UV pump light to propagate easily through the tissue model 222. The spatial resolution of the 3D printer can also lay down the colored line material of the upper films 232.

The cameras 226 can be configured to capture images or video of the tissue model 222, or both. In an example, shown in FIG. 11A, each camera 226 can be directed at an edge 234A, 234B, 234C (collectively "edges 234" or "edge 234") of the tissue model 222 so that the camera 226 can capture a view showing each of the layers 224, e.g., each base medium layer 230 and each upper film 232. A first camera 226A can be directed toward a first edge 234A and a second camera 226B can be directed toward a second edge 234B. Any two or more of the cameras 226A, 226B, 226C can be used (e.g., only cameras 226A and 226B, or only cameras 226A and 226C, or only cameras 226B and 226C, or additional combinations involving additional cameras (not shown)). The different images captured by cameras 226A, 226B, and 226C can provide for different perspectives of the tissue model deformation, and thus can provide for more accurate determination of the location of the force 228 and the resulting forces being exerted on each layer 224 of the tissue model 222. In one example, shown in FIG. 11A, the first edge 234A is on a first side of the tissue model 222, the second edge 234B is on a second side of the tissue model 222 that opposes the first side, and the third edge 234C is on a third side of the tissue model 222 that is between the first edge 234A and the second edge 234B, such as a third or front edge 234C as shown in FIG. 11A.

The cameras 226 can be connected to a processor 236, such as via one or more communication links 238A, 238B, 238C. The processor 236 can analyze the images or video captured by the cameras 226 and, through the use of appropriate image or video analysis software, can identify the deformation of each layer 224, for example in the form of a map or matrix of deformation of the tissue model 222. As noted above, because the mechanical properties of the tissue model 222 are designed, and therefore are known, the processor 236 can then calculate the forces being exerted at designated points within the tissue model 222. In an example, the processor 236 can provide a corresponding map of force vectors within the tissue model 222 based on the known material properties of the base media layers 230 and the upper films 232.

An example of image capturing and analysis equipment that can be used as the cameras 226 and the processor 236 include sensor systems developed by Brystin Research and Development, Inc., Franklin, Ohio, USA, such as the Brystin optical gauge system. The optical gauge system can use optical distance sensors to measure position or distance of a substrate (such as the tissue model 222). The Brystin optical gauge includes a microprocessor data collection and management electronics board designed to simultaneously acquire and process data from up to 16 individual sensors. The sensors (e.g., cameras 226) can be arranged in any configuration, such as a linear array along a side of the tissue model 222, or as a circular array around the tissue model 222. Another example is the Brystin medical device inspection system that can scan a laser beam and collect reflected light from the inside of a structure (e.g., from inside the transparent layers 224 of the tissue model 222).

For purposes of illustration, one method of determining forces exerted based on known mechanical properties will be demonstrated. However, other methods using other mechanical properties, either in addition to or in place of this illustrated method can be used. In the example, objects that quickly regain their original shape after being deformed by a force, with the molecules or atoms of their material returning to the initial state of stable equilibrium, often obey Hooke's law of elasticity, represented by Equation [1]:

$$F = kx \quad [1]$$

where F is the restoring force exerted on the tissue (e.g., in SI units of N (kg·m/s$^2$), k is a constant known as the rate constant or spring constant (SI units: N/m or kg/s$^2$), and x is the displacement of the tissue model end from its equilibrium position (SI units: m).

For a tissue model having multiple layers, such as the tissue model 222 with layers 224, the tissue model 222 can be modeled as a series of elastic (springs) layers. Defining the displacement from the equilibrium position of the block to be $x_2$, Hooke's law can be modified as in Equation [2]:

$$F_{Block} = -k_{eq} x_2 \quad [2]$$

The displacement from the equilibrium position of the point between the two springs can be defined as $x_1$. When the force of the tissue sample is allowed to come to equilibrium, the force between each spring (e.g., elastic layer) sums to zero, so $F_{Block} = 0$, which allows for the solution of $x_1$ according to Equations [3]-[5]:

$$-k_1 x_1 + k_2(x_2 - x_1) = 0 \quad [3]$$

$$-k_1 x_1 - k_2 x_1 = -k_2 x_2 \quad [4]$$

$$x_1 = \frac{k_2}{k_1 + k_2} x_2 \quad [5]$$

The forces within the block can be added together so that the combined calculated force can be determined, according to Equations [6]-[10]:

$$F_{Block} = -k_2 x_2 + k_2 x_1 \quad [6]$$

$$F_{Block} = -k_2 x_2 + k_2 \left( \frac{k_2}{k_1 + k_2} x_2 \right) \quad [7]$$

$$F_{Block} = -k_2 x_2 \left( \frac{k_1 + k_2}{k_1 + k_2} \right) + \frac{k_2^2}{k_1 + k_2} x_2 \quad [8]$$

$$F_{Block} = x_2 \left( \frac{-k_1 k_2 - k_2^2 + k_2^2}{k_1 + k_2} \right) \quad [9]$$

$$F_{Block} = x_2 \left( \frac{k_1 k_2}{k_1 + k_2} \right) \quad [10]$$

Equations [1]-[10] should be valid so long as the tissue model 222 and each corresponding layer 224 is behaving within the elastic range.

In an example, the images or video captured by the camera or cameras 226 are analyzed by the processor 236 in real time or near real time to allow for an interactive environment, such as an augmented reality simulation. The processor 236 can run image capturing and analysis software, such as Vision Builder for Automated Inspection (VBAI) software from National Instruments Corp., Austin, Tex., USA. The VBAI software can allow for acquisition and processing of images using any National Instruments frame grabber software, National Instruments compact vision system, National Instruments embedded vision system, National Instruments smart cameras, as well as other cameras or camera standards, such as GigE vision, IEEE 1394 cameras, and USB DirectShow cameras. The VBAI software can also allow for the configuration of a large number of machine vision tools including, but not limited to, geometric matching, optical character recognition, and particle analysis. The VBAI software can also set up complex pass or fail decisions based on inspection results and communicate trigger and inspection results over digital input/output, serial, or Ethernet protocol.

Figure 12:
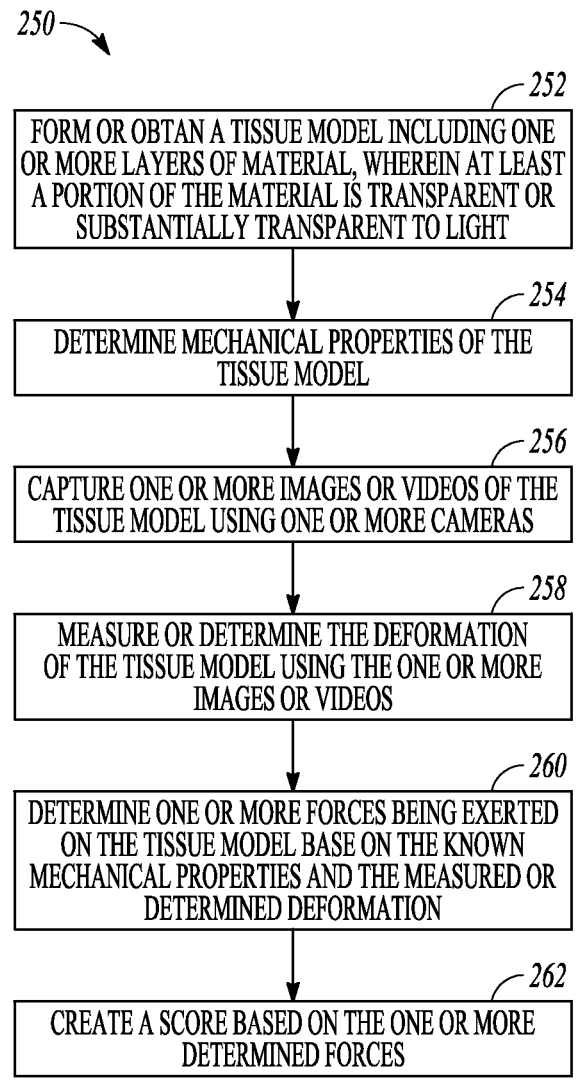
FIG. 12 is a flow diagram of an example method for assessing a medical procedure using the example systems of FIGS. 9-11.

FIG. 12 is a flow diagram of an example method 250 of assessing performance of a medical procedure. The method 250 can include, at 252, forming or obtaining a tissue model that includes one or more layers of material. The tissue model includes at least a portion that is transparent or substantially transparent to light, similar to the tissue models 200, 212, and 222 described above with respect to FIGS. 9-11. At 254, mechanical material properties of the tissue model are determined, wherein the mechanical material properties are related to forces exerted on the tissue model. The mechanical properties can include, but are not limited to, elasticity, compressibility, engineering stress, yield stress, and modulus (such as elastic modulus or Young's modulus).

At 256, one or more images or videos are captured of the tissue model with one or more cameras. At 258, the one or more images or videos are used, for example by a processor, to measure or determine the deformation of the tissue model. The determined deformation can include determining both a specific location of the deformation, the magnitude of the deformation, and the direction of deformation for any location of the tissue model.

At 260, one or more forces being exerted on the tissue are determined based on the known mechanical properties and the measured or determined deformation. Determining the one or more forces can include creating a map of force vectors that are acting within the tissue model. Determining the one or more forces can also include determining or calculating pressure buildup within the tissue model based on the forces and deformation that are determined.

The method 250 can also optionally include, at 262, determining an assessment score based on the one or more determined forces. The assessment score can be based on the tissue that would be presumed to be damaged by the force applied by the user. Scoring can also be determined on specific locations of tissue being damaged or undamaged, with some areas being given greater weight than others.

The use of an optical force measurement system, such as the example systems 210, 220 of FIGS. 10 and 11, can allow the tissue model 212, 222 to be designed with no electrical sensors or mechanical sensors being present on or within the tissue model 212, 222. As noted above, placing any electrical or mechanical components, devices, or systems within a tissue model that is to be used to simulate real, live tissue can cause the tissue model to react unrealistically. Also, it can be difficult to design a tissue model to react realistically to applied forces while electrical or mechanical devices or systems are present, including electrical or mechanical components themselves, along with supporting wires, power sources, or heat sources. Also, the use of an optical force measurement system can allow the tissue model 212, 222 to be manipulated in any way imaginable, such as cutting, tearing, manipulating, bending, twisting, and otherwise abusing while the force sensing and measurement system will not be adversely affected. In contrast, systems where an electrical or mechanical sensor is used can be adversely affected if the manipulation of the tissue model could alter operation of the sensor, such as by cutting a wire or damaging the sensor.

In an example, one or more of the systems described above (e.g., the system 10 of FIGS. 1-5, the system 110 of FIG. 7A, the system 120 of FIG. 7B, the system 130 of FIG. 7C, the system 210 of FIG. 10, and the system 220 of FIG. 11A) can be combined with one or more computing devices to provide for an "augmented reality" (AR) system that can provide for augmented reality of the tissue model. For example, the one or more assessment systems can be coupled to a peripheral computing device comprising a camera, such as a portable computing device (e.g., a tablet computer such as an APPLE IPAD, a SAMSUNG GALAXY TAB, or a GOOGLE NEXUS, or a mobile phone-type device, such as an APPLE IPHONE or IPOD TOUCH, a SAMSUNG GALAXY S or GALAXY NOTE). The peripheral computing device can be in communication with a processor of the system (e.g., the processor 34 in FIG. 1 or the processor 236 in FIG. 11A), wherein the system processor can send information such as force or deformation measurements to the peripheral computing device. The camera of the peripheral computing device can then be used to take a video or series of images of the tissue model. The processor or the peripheral computing device can use the information from the system processor to alter or augment the image taken by the peripheral computing device camera to provide a simulation video that is displayed on the screen of the peripheral computing device. The simulation video can include simulated virtual reality scene of what would be expected to occur in the live tissue that the tissue model is simulating. The AR system can provide for added visual realism in addition to the mechanical realism that can be provided by the tissue model.

The methods and systems described above can be used on any type of tissue model or tissue for which analysis of a medical procedure is desired. Examples of tissue models that can be used with the methods and systems of the present disclosure include, but are not limited to, animal tissue models and frozen human cadaveric tissue, and simulated artificial tissue, such as organosilicate-based tissue models. Animal tissue models and frozen human cadaveric tissue can be used to simulate human tissue can have fidelity issues as well as high cost and ethical issues, which can make animal tissue or cadaveric tissue models a poor simulation for living tissue. The factors that contribute to the variation in constitutive properties amongst fresh or live human tissue have been hypothesized but poorly documented. Fresh human tissue models are logistically difficult to obtain, store, process and lack embedded assessment methods for formative and summative feedback.

The physical properties that can be considered for soft tissues include homogeneity, nonlinear large deformation, anisotropy, viscoelasticity, strain rate insensitivity and compressibility. A human tissue database can include tissue characteristics data that provide values for comparison with simulator materials.

The creation of a human tissue property database can provide for accurate constitutive computer simulation models of structures, injury and disease. The primary components affecting the creation of artificial tissue models are material costs and supplies, accurate anatomical modeling, knowledge of the mechanical properties of the represented tissues, choosing the right materials, assemblage of the models in an accurate representation of human anatomy, and model development based on educational principals and "backwards-design" with an embedded-assessment strategy to maximize the learning.

In an example, data regarding material properties of tissue to be simulated is determined by harvesting soft-tissue specimens within 24 hours of death of a subject. The specimens are warmed to body temperature and then subjected to uniaxial or biaxial testing to determine viscoelastic mechanical properties. In addition, electroconductive, thermoconductive, and indentation experiments can be performed on a plurality of different tissue types. The data is then stratified according to gender, age, and body mass index (BMI).

In an example, data from the testing of the tissue samples is used to form a tissue database, such as a human tissue database, which can be used to guide the formulation of organosilicate base material with the objective of tailoring the recipes of artificial tissues to match the properties of fresh human tissue.

In an example, analyzing the similarities between human tissue materials and simulation materials is to compare characteristics of their stress-strain curves. The stress-strain curves can be generated by a preprogrammed routine in Excel on an MTS computer based on inputted width, thickness, and initial displacement values and load vs. extension data.

Engineering stress is defined as a force per unit area:

$$\sigma = \frac{F}{A} \quad [11]$$

where F is the applied force and A is the cross sectional area. Green strain is defined as:

$$G = \frac{1}{2}\frac{(L_o - L^2)}{L^2} \quad [12]$$

where $L_0$ is the original length of the sample and L is the final length of the sample. The Young's modulus can be found by taking the slope of the stress-strain curve at the initial linear portion of the graph. Yield stress is defined as the stress at which the material begins to break and can be found on the stress-strain curve as the maximum stress value on the stress-strain curve. The corresponding strain value is defined as the strain at yield.

The data from the human tissue database allows tailoring of the organosilicate base material. Simulator models can be produced using commercially available off-the-shelf (COTS) organosilicate materials. The base material can undergo modifications to change cross-linking, electrical conductivity, thermal conductivity, reflectivity, indentation, odor, and color. Pigments and dyes can be added to the organosilicate material to create anatomically accurate color mapping of the simulator model.

In an example, silicone-based materials are useful in simulation and biomedical applications. Silicon is an element that is rarely found in its elemental form but can be found as oxides or as silicates. Silica is an oxide with formula $Si_{O2}$ that can have amorphous or crystalline structure. Silicates are salts or esters of silicic acid (general formula $[Si_{OX}(OH)_{4-2X}]_n$) that contain silicon, oxygen, and metal elements. Silicones are polymers made of silicon, oxygen, carbon, and hydrogen with repeating SiO backbone (Colas, 2005). These polymers are created synthetically with the addition of organic groups to the backbone via silicon-carbon bonds. A common silicone is polydimethylsiloxane (PDMS) with monomeric repeat unit $[SiO(CH_3)_2]$. The number of repeat units and degree of cross-linking within the silicone polymer can account for the different types of silicone materials available for different applications. Silicones have been used in biomedical applications because of their high biocompatibility, their chemical inertness, and their resistance to oxidation.

In an example, the material of the tissue model can comprise platinum based silicone-rubbers, tin cured silicone rubbers or urethane rubbers. The sources and trade names of these materials are presented in Table 1. Table 2 provides the foams and additives used in the present application.

In an example, a tissue-specific organosilicate base material is formed onto the three-dimensional printed model, such as by casting, depositing, molding, and the like, or can be directly formed by three-dimensional printing. The organosilicate base material conforms to the details of the model to create an exact replica of the patient specific anatomy.

In an example, organosilicate material is added in precise layers to imitate the physiologically distinct layers found in skin and other human tissues. In an example, a first layer of a first organosilicate material is applied to the three-dimensional printed model and allowed to cure to simulate a first layer of tissue. A second layer of a second organosilicate material is applied to the first layer, wherein the second organosilicate material can be different than or the same as the first organosilicate material and allowed to cure to simulate a second layer of tissue. Subsequent layers (e.g., a third, fourth, and fifth layer, etc.) can be added over the second layer. The layers might not all be cured in between if the layers are to be inseparable. However, substances, devices, sensors can be added between or within each layer.

In an example, one thick layer of a first organosilicate material or a plurality of thin layers of the first organosilicate material can be applied to the three-dimensional model in order to simulate a substantially uniform tissue structure or layer. Once the material layer or layers have been added to the desired thickness, the outer material can be separated from the mold and sealed.

In an example, the organosilicate base can be a soft, room temperature vulcanized (RTV) silicone rubber with a hardness of less than 30 shores. The two-part component can be addition cured and platinum catalyzed to result in high tear strength and flexible mold compounds. The organosilicate base can bond to plastics. The percentage of mixing of A and B change depending on the application of the tissue model.

In an example, a platinum salt in portion B (OSHA PEL and ACGIH threshold limit value 0.002 mg/m³ (as Pt)) has the following technical specifications.

| | | |
|---|---|---|
| a. | Mix ratio, by weight | 1A:1B |
| b. | Hardness, Shore A | 10 ± 2 |
| c. | Pour time, minimum | 6 min |
| d. | Demould time @ 25° C. (77° F.) | 30 min |
| e. | Color | off white translucent/Colorless |
| f. | Viscosity, mixed | 15,000 cP |
| g. | Specific volume (in3/lb) | 25 |
| h. | Specific gravity @ 25° C. (77° F.) | 1.10 |
| i. | Shrinkage upon cure | Nil |
| j. | Flash point > 350° F. | |

Figure 13:
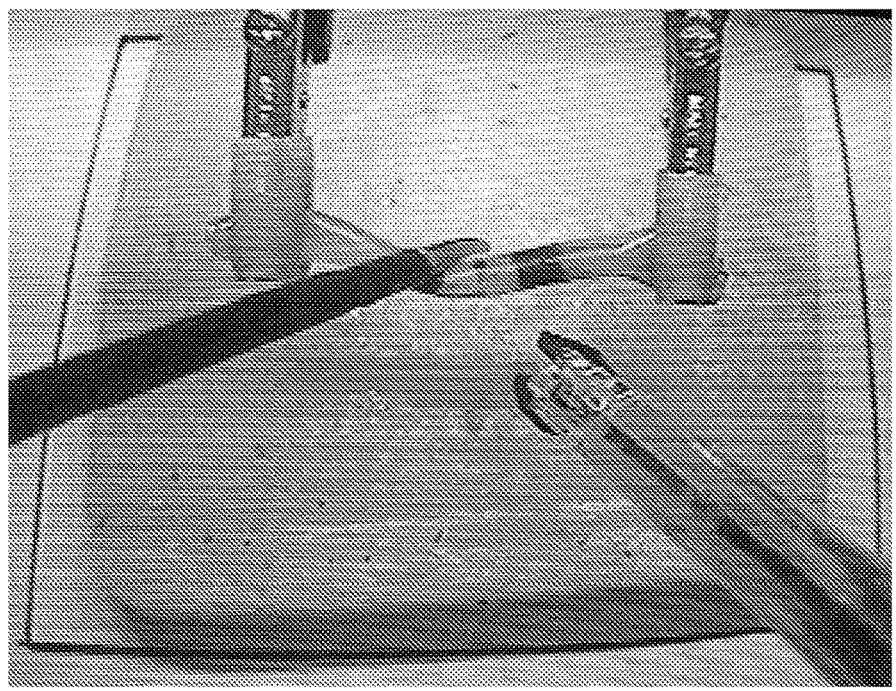
FIG. 13 is an illustration of animate renal artery training model with blood.

Using an organosilicate base material, the successful creation of an artificial tissue training model has been created for a human renal artery (FIG. 13) in order to meet the specifications of the American Urological Association for laparoscopic and robotic clip applying (Syverson, et al., 2011). The simulator tissue was color mapped to mimic human renal artery and filled with artificial blood to a mean arterial pressure (MAP) of 80±2 mmHG. Solid black pigment lines and dotted black pigment lines were added for training purposes to indicate areas for clipping and cutting respectively. The model was fitted into a mechanical apparatus to mimic a beating motion.

Figure 14:
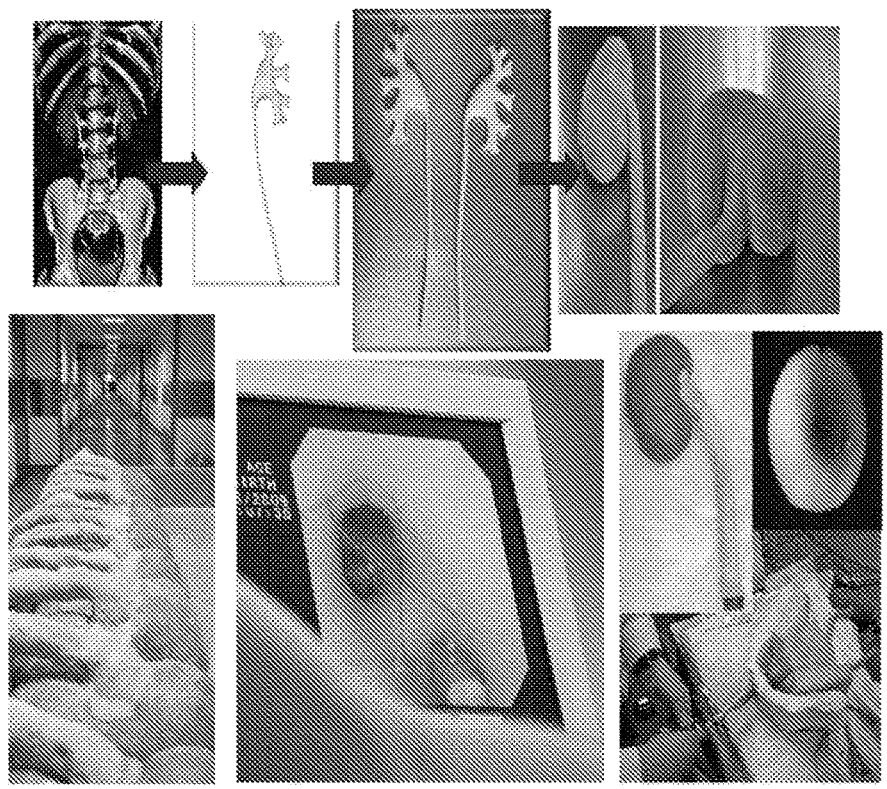
FIG. 14 is an illustration of animate kidney training model for endoscopy.
Figure 15A:
FIG. 15A is an illustration of BLAST face Model with rare earth element based coating under normal light.
Figure 15B:
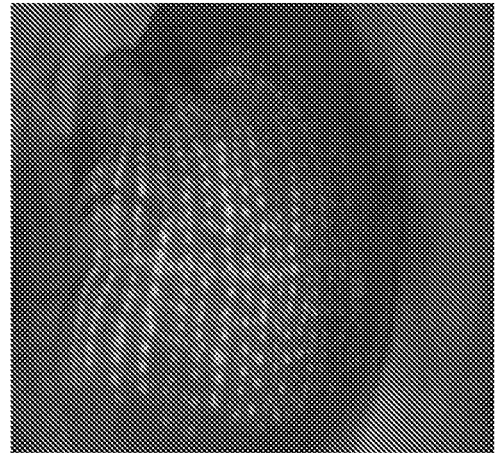
FIG. 15B is an illustration of BLAST face model with rare earth element coating under black light.
Figure 15C:
FIG. 15C is an illustration of BLAST face model with rare earth element coating under UV light.
Figure 15D:
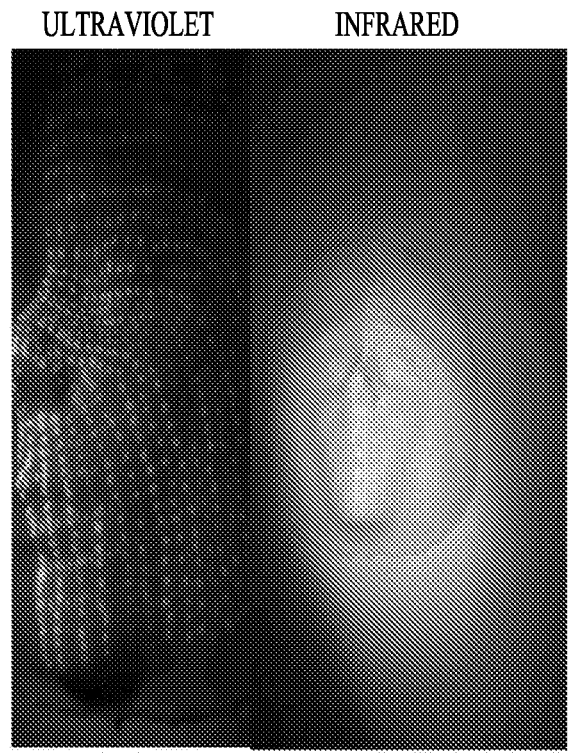
FIG. 15D is an illustration of BLAST face model with rare earth element coating under IR light.

A kidney simulator (FIG. 14) was also developed using the techniques described above. The simulator utilizes renal tissue properties, e.g., from a human tissue database, accurate human anatomical modeling (stereolithographic prototyping) and color mapping to create realistic internal features such as the endoluminal ureter and the calyceal kidney collecting system. The model can be used in combination with artificial kidney stones and fluid to simulate procedures such as an ureteroscopy (FIG. 16), retrograde pyelography, urethral stent placement, nephro-lithotomy, laser and extracorporeal lithotripsy and kidney stone extraction.

The materials used to create human tissue analogues need to meet many specifications in order to successfully emulate actual human tissues. In some examples, organosilicate materials are used as the base material for creating artificial tissues. Commercial off the shelf (COTS) organosilicate materials can undergo repeated cycles of revision by continually comparing testing data of the artificial tissue to the human tissue database.

Organosilicate materials are stable and do not call for specialized storage or shipping. These materials are cost effective and are less expensive compared to animal and cadaveric models. The material is durable and can often be reused which also adds to cost-effectiveness.

The organosilicate polymer base material is mostly clear in color and is capable of being cured in room air or within a mold. The polymer base material is mixed thoroughly with additives, resins, or indicators to allow for equal distribution of the base throughout the combined mixture. The mixture is placed in a mold to form a molded sample layer by layer. Once fully cured, the mold is de-cast, and the molded sample is coated with a talcum powder and is washed with cold water to remove excess talcum powder.

Reflectivity is a factor in ultrasound and fluoroscopy procedures. The organosilicate material of the tissue models of the present disclosure has demonstrated useful reflectivity properties with respect to ultrasound and fluoroscopy. This reflectivity allows the materials to be used in simulated procedures such as ultrasound and fluoroscopy.

Possible modifications affecting viscoelastic properties include ratio changes, chemical additives and ultraviolet (UV) light exposure. For example, organosilicate films that are exposed to an ultraviolet light source have at least a 10% or greater improvement in their mechanical properties (i.e., material hardness and elastic modulus) compared to the as-deposited film (U.S. Pat. No. 7,468,290). The UV light has been shown to cause increased cross-linking in the material, which can increase the modulus and decrease the elasticity (Crowe-Willoughby et al., 2009). In some examples, the intensity and duration of UV exposure can be modulated to provide for fine-tuning of desired mechanical properties.

The completed tissue models can be used in combination with other substances in order to replicate a clinical situation. The organosilicate based tissue models can be used in the absence of silicone spray and can instead be implemented with inexpensive clinical substitutive artificial blood, saliva, urine, or vomit.

The uses for physiologically accurate tissue simulators are widespread. Organosilicate based materials can be subjected to extremes such as cuts, burns, gun shots, and blast pressures. They can then be repaired by the trainee as part of a simulated procedure. They can also be repaired via exposure to UV lighting, reducing their cost, and increasing their usage.

The tissue simulators can be used independently or as hybrid models attached to standardized patients or confederates in training environments. The trainee is able to perform tasks such as needle sticks and suturing on the attached analogue tissues without harming the volunteer. The combination of patient interaction and accurate tissue simulation provides for an ideal training environment.

Examples of types of tissues that can be formed using the organosilicate base materials of the present disclosure include, but are not limited to; fat, connective tissues, nerve, artery, vein, muscle, tendon, ligaments, renal artery tissue, kidney tissue, ureter tissue, bladder tissue, prostate tissue, urethra tissue, bleeding aorta tissue, pyeloplasty tissue, Y/V plasty tissue, airway tissue, tongue tissue, complete hand tissue, general skin tissue, specific face skin tissue, eye tissue, brain tissue, vaginal wall, breast tissue, nasal tissue, cartilage, colon tissue, stomach tissue, liver tissue, rectum, and heart tissue.

Figure 16:
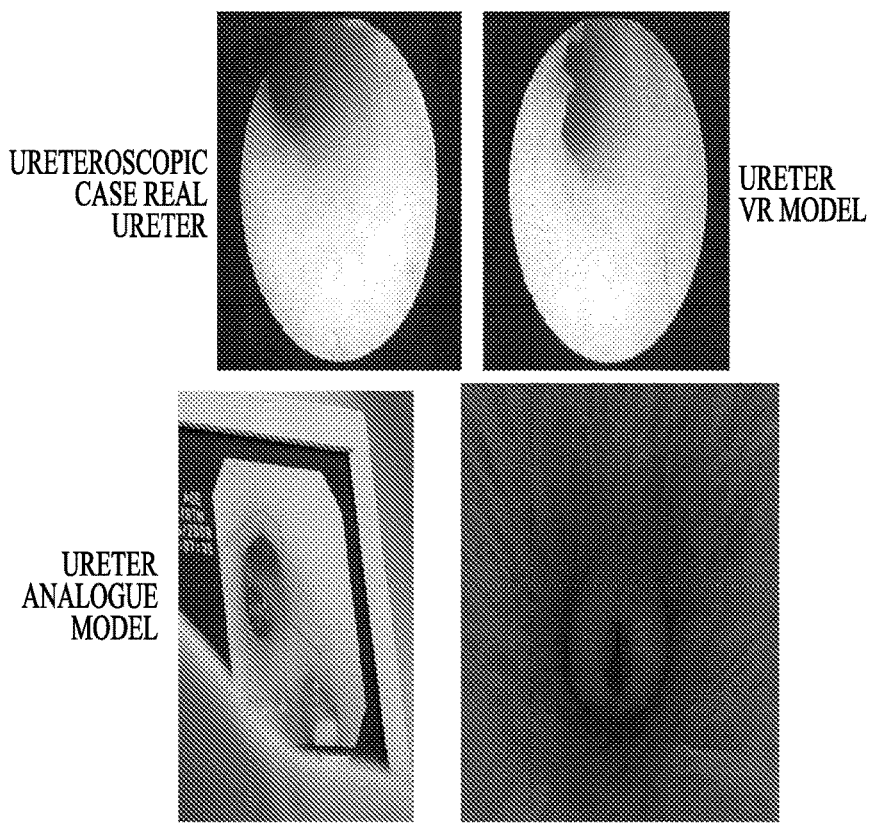
FIG. 16 is an illustration of animate ureter training model for endoscopy.
Figure 17:
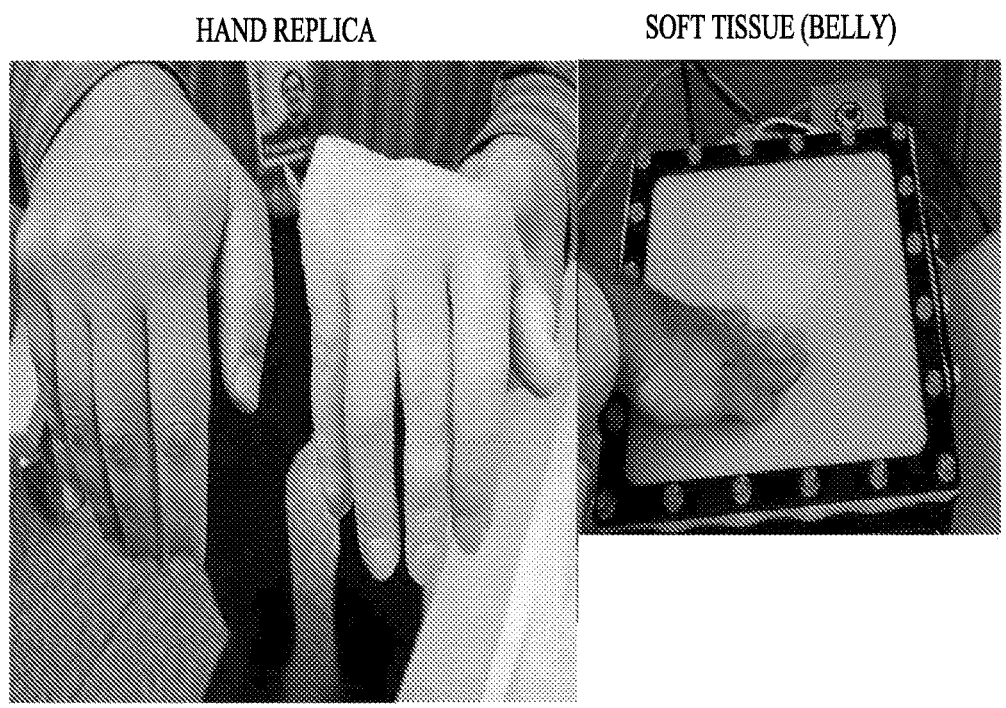
FIG. 17 is an illustration of animate hand training model for endoscopy.

FIGS. 15-17 show examples of specific artificial tissue training models in accordance with the present disclosure. The artificial tissue training model has been created for a human face as shown in FIGS. 15A-15D. FIGS. 15A-15D also show an indicator material that has been placed on or within the artificial tissue that can be seen under various light sources, such as under an ultraviolet, or "black" light (FIGS. 15A, 15B, and 15C) or under an infrared light (FIG. 15D). FIG. 16 is an illustration of animate ureter training model for endoscopy. FIG. 17 is an illustration of animate hand training model for endoscopy.

EXAMPLES

Example 1

Assessment markings 16 comprising a grid 20 of assessment lines 22 were embedded in a synthetic simulated skin tissue model 12, as best seen in FIG. 2. An assessment image 38 of the tissue model 12 and the assessment markings 16 was taken and registered with a reference image 40, and the two images 38, 40 were compared and analyzed to determine a score for the performance of a surgical task.

The synthetic skin tissue model 12 used for suturing exercises was an organosilicate-based material created with reference to the Human Tissue Database from the Center for Research in Education and Simulation Technologies (CREST) group at the University of Minnesota. Mechanical properties of human tissue can allow for reference of elastic modulus among other value markers that can be used to build a material recipe that more accurately simulates human skin.

Assessment markings 16 were integrated into the simulated skin tissue model 12 for use in Black Light Assessment of Surgical Technique (BLAST). The assessment markings 16 are transparent under room lighting conditions but become visible in a specified color under a UV black light (wavelength range 340-380 nm). The assessment markings 16 were in the form of a grid 20 of gridlines 22 in order to capture tension, overlap, and approximation of the synthetic tissue. A set of five registration points 42 were included surrounding the perimeter of the grid lines 22. The grid 20 of the assessment markings 16 were configured to show up as blue lines under the UV black light, while the registration points 42 were configured to show up as red dots.

A trainee or student performed a specific suturing exercise on the synthetic skin tissue model 12, resulting in the sutured tissue model 12 shown in FIG. 3. An assessment image 38 of the sutured tissue model 12 and the assessment markings 16 was captured and compared to a reference image 40. In one example, the reference image was created by having an expert complete the suturing exercise and an image of the resulting sutured skin tissue model was captured as a reference image under black light. In another example, discussed below, the image of the unsutured tissue model shown in FIG. 2 was used as the reference image 40.

The assessment image 38 of the trainee's sutured exercise was compared to the reference image 40 to give the trainee feedback on his or her performance for the suturing exercise. As described in more detail below, the feedback was given to the trainee in the form of an image of the trainee's sutured tissue overlaid on top of the reference sutured tissue as well as a quantitative assessment score.

Assessment of the trainee's performance was accomplished by isolating the assessment markings 16A from both the assessment image 38 and the assessment markings 16B from the reference image 40, followed by registration of the assessment image assessment markings 16A and the reference image assessment markings 16B. It was possible to isolate the blue color of the assessment markings 16A, 16B from the red color of the registration points 42. Image analysis of the image 38 and the reference image 40 was accomplished using the MATLAB software program (MathWorks, Inc., Natlick, Mass., USA). Registration of the assessment image 38 and the reference image 40 was accomplished using the cpselect tool of MATLAB where corresponding registration points 42 were picked manually. The cpselect function allows a MATLAB user to manually pick control points of two corresponding images for registration. The image processing can also be configured so that the registration points 42 are found automatically.

The centers of the red registration points 42 were used to register the images 38, 40 together. X and Y coordinates of the center of each registration point 42 was isolated by thresholding a gray scale image of each image 38, 40 with the isolated registration points and eroding each of the five dots to turn them into solid objects and fill any gaps within the five circles. The regionprops and bwlabel functions of MATLAB were used to find and label the x and y coordinates of each circle. The regionprops function can be used to pick out the coordinates of the center of the thresholded circular objects that are used as registration points. The regionprops function can be used to automatically find the coordinates of the registration points without having to use the cpselect tool. The bwlabel function of MATLAB can be used to label each of the five registration points 42.

The five coordinate pairs of the registration points 42 in the unsutured image (e.g., the reference image 40 of FIG. 2) were used as the base points and the coordinate pairs of the registration points 42 from the sutured image (e.g., the assessment image 38 of FIG. 3) were used as the input points in a transformation of the assessment image 38 in order to register the image 38 with the reference image. The type of transformation used depends on the type of distortion of the assessment image as compared to the reference image. In this example, an affine transformation via the cp2tform function of MATLAB was used. The cp2tform uses affine transformation within the imtransform function of MATLAB to spatially transform the assessment image 38 so that it is registered with the reference image 40.

After registering the assessment image 38 with the reference image 40, the assessment markings 46A, 46B of the two images can be compared by the image processing software to determine a quantitative score for the medical procedure. The gridlines 22A, 22B of each image 38, 40 was thresholded a gray scale image of each image 38, 40 to isolate the gridlines 22A, 22B. The thresholded image of the assessment image gridlines 22A was overlaid over the thresholded image of the reference image guidelines 22B to provide for visual feedback of the sutured skin tissue model, as shown in FIG. 5. Each of the gridlines 22A, 22B can be shown differently, such as by using a first color to represent the assessment image gridlines 22A and a different second color to represent the reference image gridlines 22B. In another example, one color can correspond to areas of the grid 20 where the assessment image gridlines 22A overlap the reference image gridlines 22B, while another color can represent areas where the gridlines 22A, 22B do not match up.

Quantitative feedback, such as a quantitative assessment score, can also be given. In the example shown in FIG. 5, a quantitative score of the percent of pixel overlap can be used as the quantitative measure. In the example of FIG. 5, the percent of pixel overlap is about 83.16%.

The results of the image registration and processing show that it is possible to analyze an image of a sutured synthetic tissue and compare it to a reference image to provide visual and quantitative feedback to the user. The results of the method of incorporating assessment lines into the skin analog models show that it is possible for the assessment lines to be invisible to the user while the exercise is being completed. This can be useful in providing a training environment in which the user would be unable to use the reference lines to adjust his or her technique while completing the exercise. Additionally, having an unaltered piece of skin without visible assessment lines more closely replicates the skin of a patient seen in the clinical setting.

The method also shows that the assessment markings 16A, 16B are robust enough under a UV black light to be analyzed successfully as an image. This can be another factor for post-procedure analysis in which there is high ease of use and repeatability for the user when capturing images of the synthetic tissues.

Example 2

Two capsule products were used to form a film on a top surface of a tissue model. The first film was a pre-formed polyester based Fujifilm Prescale 4LW pressure sensing sheet (Pressure Metrics LLC, Whitehouse Station, N.J.) placed on top of a first sample of a tissue model. The second film was a paint-on coating formed with powder based pressure sensitive capsules deployed in the coating (Luna Innovations, Roanoke, Va.) formed on a second sample of the tissue model.

The two films were tested via tissue handling simulating single grasps of bowel tissue. Samples of a tissue model of artificial single-layered bowel tissue made from silicon rubber (LGI-10, Simulab Corporation, Seattle, Wash.) was employed and reused for all experiments.

A Mechanical Smart Endoscopic Grasper (MSEG), described in P. R. Roan, "An Instrumented Surgical Tool for Local Ischemia Detection," *Pro Quest Dissertations and Theses*, University of Washington, USA (2011), was used with identical settings and calibration established in the Roan article and in S. De, "The Grasper-Tissue Interface in Minimally Invasive Surgery: Stress and Acute Indicators of Injury," *Department of Bioengineering*, University of Washington, USA (2008). The MSEG device was used to apply and measure constant grasps with no overshoot.

The surface of two separate samples of the tissue model was layered with each of the pressure sensing films. The Fujifilm Prescale 4LW was placed on top of one of the samples of the tissue model. The powder based capsules were suspended in a clear silicone adhesive and painted on the surface of the artificial tissue. The test bed consisted of suspending the synthetic bowel from two pedestals 3 centimeters (cm) apart and applying a series of constant, measured force levels, applied for 2 minutes to each test site. The target force levels ranged from 1.5 Newtons (N) to 3.5 N at increments of 0.25 N. The grasp sites were linearly separated by 2 cm.

After at least 20 minutes had elapsed, a photo of the capsule indicators was taken with 14.2 megapixel (MP) resolution, 22.5 bits color depth, and 11.3 EV dynamic range digital camera under standard office lighting conditions. The resulting files were processed with ImageJ and MATLAB into a 376×400 pixel, 8-bit image individually to quantify the color intensity in different regions via the colormap tool. The intensity was linearly normalized to be between 0 and 1.

Table 2 shows the resulting normalized mean intensity and calculated area of colored pixels where the applied force measurement was provided by the MSEG tool hardware. The mean intensity was calculated over all pixel values in each grasp image, and the affected area was computed by summing all pixel areas that exhibited values above the baseline threshold of no applied pressure.

TABLE 2

| Applied Force (N) | Film-Based | |
| --- | --- | --- |
| | Mean Intensity | Affected Area (mm²) |
| 1.50 | 0.00084 | 11.414 |
| 1.75 | 0.00126 | 14.569 |
| 2.00 | 0.00615 | 74.500 |
| 2.25 | 0.03102 | 148.68 |
| 2.50 | 0.01512 | 96.207 |
| 2.75 | 0.03537 | 174.27 |
| 3.00 | 0.00712 | 88.401 |
| 3.25 | 0.02798 | 197.09 |
| 3.50 | 0.09971 | 292.29 |
| Pearson R | 0.71 ($p < 0.03$) | 0.87 ($p < 0.003$) |
| Spearman $\rho$ | 0.78 ($p < 0.01$) | 0.88 ($p < 0.003$) |

Increasing target force levels were applied as indicated by the MSEG tool. A monotonic increase in overall intensity for each grasp in the film dye was expected. While there is an overall trend of increase, as indicated by Spearman's $\rho > 0.78$ in Table 1, there were several deviations from a purely monotonically increasing trend. Further investigation indicated possible slippage in the grasper force sensor, which may have caused larger forces to be applied earlier in the sequence. Moreover, the patterns formed by the released dye show a pressure distribution in much finer spatial resolution (0.1 meters according to the manufacturer) than the single grasper force measurement provided by the MSEG tool, revealing that only the first row of grasper jaw "teeth" engage the tissue at a high force due to the angle of incidence. This illustrates that even if the MESG tool force sensor was accurately calibrated, the computation of applied pressure distribution may be inaccurate if done with simple assumptions about grasper area, angle of engagement, and tool-tissue orientation. The inventors suspect that the levels indicated by the MSEG tool were less accurate than those derived from the capsule approach.

Limitations of the capsule approach may include time and repeatability. Currently, the dye takes time to develop its color and this change is irreversible. Thus, it may be desirable for the indicators to be disposable and quickly replaceable.

The results of this study show that the capsule approach can provide an inexpensive, quantitative method of measuring tool-tissue pressure distribution at a high spatial resolution.

There can be many potential uses for the techniques described in this disclosure. Current methods for providing feedback to students learning suturing technique are often qualitative in nature and include oral feedback from an expert. This type of feedback can be important for developing proper instrument handling, knot tying and needle use. However, there is no quantitative or visual feedback for the student regarding the tension environment around the wound, the amount of overlap created or accurate approximation of the simulated skin. The method of this disclosure allows for quantitative and visual feedback of the wound environment.

In a training situation, a student can be provided with immediate feedback in two forms. The first form is the visual feedback in comparing his or her piece of synthetic sutured skin to the reference image. The use of different colors in the overlaid image can allow the student to clearly see the visual differences to give the student feedback on how to improve. The quantitative feedback given in the form of a number, such as percent of pixel overlap, can allow for recording of progress over time as more exercises are completed. This can show improvement or decline in the student's performance. Both the visual image and percent pixels hit number can be stored to build a record of progress of a student's suturing technique. In an assessment situation, the percent of pixel overlap is a quantitative value that can be a useful metric. Various ranges of values could correspond to different levels of proficiency in completing a suturing task. A cut-off point can be defined that would allow a student to pass a particular suturing task. Analysis of these values within a group of students would allow for comparisons to be made between a student and his or her peers.

For the purpose of demonstrating the overall concept of using BLAST and MATLAB programming, the unsutured image was used as the reference image, as described above. In more complex suturing situations, such as a Y-V plasty, the unsutured image may not be useful as the reference image due to the large deformation and restructuring of tissue as a result of the suturing technique. In this case, a group of experts can perform the suturing exercise and an average of the images collected from the experts can be used as the reference image to which the user's image can be compared.

Assessment line patterns other than the grid 20A, 20B described above can be used. Other patters may be more effective or efficient in discriminating between levels of suturing technique. Higher line resolution or concentration of lines around the simulated wound can also prove to be more effective.

To better illustrate the present systems and methods for analyzing performance of a medical procedure, a non-limiting list of example embodiments is provide here:

Embodiment 1 can include subject matter (such as an apparatus, a device, a method, or one or more means for performing acts), such as can include a system for assessing performance of a procedure. The subject matter can comprise a tissue model or a tool comprising assessment indicators applied thereto, one or more image-capturing devices for capturing one or more assessment images of the assessment indicators while or after a user performs the medical procedure, and a processor configured to analyze the assessment indicators in the one or more assessment images and provide feedback to the user.

Embodiment 2 can include, or can optionally be combined with the subject matter of Embodiment 1, to optionally include the feedback provided to the user comprising one or both of a cumulative score or formative feedback.

Embodiment 3 can include, or can optionally be combined with the subject matter of one or any combination of Embodiments 1 and 2, to optionally include the processor being configured to analyze the assessment indicators in the one or more assessment images by comparing the assessment indicators to a reference.

Embodiment 4 can include, or can optionally be combined with the subject matter of one or any combination of Embodiments 1-3, to optionally include the reference comprising a reference image or a reference map comprising reference indicators.

Embodiment 5 can include, or can optionally be combined with the subject matter of one or any combination of Embodiments 1-4, to optionally include the processor being configured to compare the assessment indicators in the one or more assessment images to the reference by comparing the assessment indicators to the reference indicators in the reference image or the reference map.

Embodiment 6 can include, or can optionally be combined with the subject matter of one or any combination of Embodiments 1-5, to optionally include the processor being configured to analyze the assessment indicators with image processing software running on the processor.

Embodiment 7 can include, or can optionally be combined with the subject matter of one or any combination of Embodiments 1-6, to optionally include the assessment indicators comprising a material sensitive to a predetermined wavelength of light or range of wavelengths.

Embodiment 8 can include, or can optionally be combined with the subject matter of one or any combination of Embodiments 1-7, to optionally include the assessment indicators comprising an ultraviolet sensitive material.

Embodiment 9 can include, or can optionally be combined with the subject matter of one or any combination of Embodiments 1-8, to optionally include the ultraviolent sensitive material being transparent under normal light.

Embodiment 10 can include, or can optionally be combined with the subject matter of one or any combination of Embodiments 1-9, to optionally include the ultraviolet sensitive material being a polyurethane-based material.

Embodiment 11 can include, or can optionally be combined with the subject matter of one or any combination of Embodiments 1-10, to optionally include the one or more assessment images as comprising a series of assessment images as a video.

Embodiment 12 can include, or can optionally be combined with the subject matter of one or any combination of Embodiments 1-11, to optionally include the assessment indicators comprising capsules impregnated with a material, wherein the capsules are configured to expose the material upon exposure to a stimulus exceeding a stimulus threshold.

Embodiment 13 can include, or can optionally be combined with the subject matter of one or any combination of Embodiments 1-12, to optionally include the stimulus comprising at least one of pressure exerted on the capsule, mechanical force exerted on the capsule, heat energy on the capsule, electromagnetic energy on the capsule, light having a predetermined wavelength or range of wavelengths emitted onto the capsule, and a chemical species contacting the capsule.

Embodiment 14 can include, or can optionally be combined with the subject matter of one or any combination of Embodiments 1-13, to optionally include the material being configured to be viewable by the one or more image-capturing devices when the capsules are exposed to the stimulus source.

Embodiment 15 can include, or can optionally be combined with the subject matter of one or any combination of Embodiments 1-14, to optionally include the capsules being included in a film applied to a surface of the tissue model or the tool.

Embodiment 16 can include, or can optionally be combined with the subject matter of one or any combination of Embodiments 1-15, to optionally include the capsules being an additive within the tissue model or the tool.

Embodiment 17 can include, or can optionally be combined with the subject matter of one or any combination of Embodiments 1-16, to optionally include the tissue model or the tool not including any electrical sensors or mechanical sensors.

Embodiment 18 can include, or can optionally be combined with the subject matter of one or any combination of Embodiments 1-17, to include subject matter (such as an apparatus, a device, a method, or one or more means for performing acts), such as can include a system for assessing performance of a medical procedure. The subject matter can comprise a tissue model, one or more image-capturing devices each configured to capture one or more images of the tissue model, and a processor configured to analyze the one or more images from the one or more image-capturing devices to determine a deformation of the tissue model and determine a force exerted on the tissue model based on the determined deformation of the tissue model.

Embodiment 19 can include, or can optionally be combined with the subject matter of one or any combination of Embodiments 1-18, to optionally include the tissue model comprising at least a portion that is transparent or substantially transparent to a particular wavelength of light or range of wavelengths when viewed at a predetermined angle, and the one or more image-capturing devices are configured to capture one or images of at least the transparent or substantially transparent portion of the tissue model.

Embodiment 20 can include, or can optionally be combined with the subject matter of one or any combination of Embodiments 1-19, to optionally include the tissue model comprising a plurality of layers, each layer comprising the transparent or substantially transparent portion.

Embodiment 21 can include, or can optionally be combined with the subject matter of one or any combination of Embodiments 1-20, to optionally include the one or more image-capturing devices being directed toward one or more edges of the plurality of layers.

Embodiment 22 can include, or can optionally be combined with the subject matter of one or any combination of Embodiments 1-21, to optionally include each of the plurality of layers comprising a transparent or substantially transparent base medium that is substantially transparent to a particular wavelength of light or range of wavelengths.

Embodiment 23 can include, or can optionally be combined with the subject matter of one or any combination of Embodiments 1-22, to optionally include an opaque or substantially opaque film deposited on the base medium that is substantially opaque to the particular wavelength or range of wavelengths.

Embodiment 24 can include, or can optionally be combined with the subject matter of one or any combination of Embodiments 1-23, to optionally include the opaque or substantially opaque films of the plurality of layers comprising different colors.

Embodiment 25 can include, or can optionally be combined with the subject matter of one or any combination of Embodiments 1-24, to optionally include the processor being configured to distinguish each of the plurality of layers in the one or more images.

Embodiment 26 can include, or can optionally be combined with the subject matter of one or any combination of Embodiments 1-25, to optionally include the one or more image-capturing devices comprises a first image-capturing device configured to capture an image of a first position of the transparent or substantially transparent portion of the tissue model and a second image-capturing device configured to capture an image of a second position of the transparent or substantially transparent portion of the tissue model.

Embodiment 27 can include, or can optionally be combined with the subject matter of one or any combination of Embodiments 1-26, to optionally include the processor being configured to determine the force exerted on the tissue model based on known mechanical properties of the tissue model and the determined deformation of the tissue model.

Embodiment 28 can include, or can optionally be combined with the subject matter of one or any combination of Embodiments 1-27, to optionally include the tissue, the tissue model, or the tool not including any electrical sensors or mechanical sensors.

Embodiment 29 can include, or can optionally be combined with the subject matter of one or any combination of Embodiments 1-28, to include subject matter (such as an apparatus, a device, a method, or one or more means for performing acts), such as can include a synthetic tissue model for simulating a tissue for a medical procedure. The subject matter can include a base material and capsules applied to the base material, the capsules being impregnated with a material, wherein the capsules are configured to expose the material upon exposure to a stimulus source exceeding a stimulus threshold.

Embodiment 30 can include, or can optionally be combined with the subject matter of one or any combination of Embodiments 1-29, to optionally include the stimulus source comprising at least one of pressure exerted on the capsule, mechanical force exerted on the capsule, heat energy on the capsule, electromagnetic energy on the capsule, light having a predetermined wavelength or range of wavelengths emitted onto the capsule, and a chemical species contacting the capsule.

Embodiment 31 can include, or can optionally be combined with the subject matter of one or any combination of Embodiments 1-30, to optionally include the material comprising at least one of one or more dyes, one or more chemical, one or more metal, and one or more pH indicators.

Embodiment 32 can include, or can optionally be combined with the subject matter of one or any combination of Embodiments 1-31, to optionally include the material being configured to be viewable by one or more image-capturing devices when the capsules are exposed to the stimulus source.

Embodiment 33 can include, or can optionally be combined with the subject matter of one or any combination of Embodiments 1-32, to optionally include the capsules being included in a film applied to a surface of the tissue model.

Embodiment 34 can include, or can optionally be combined with the subject matter of one or any combination of Embodiments 1-33, to optionally include the capsules being an additive within the tissue model or the tool.

Embodiment 35 can include, or can optionally be combined with the subject matter of one or any combination of Embodiments 1-34, to optionally include the tissue model not including any electrical sensors or mechanical sensors.

Embodiment 36 can include, or can optionally be combined with the subject matter of one or any combination of Embodiments 1-35, to include subject matter (such as an apparatus, a device, a method, or one or more means for performing acts), such as can include a method of assessing performance of a medical procedure. The subject matter can include applying assessment indicators to a tissue model, or a tool, capturing one or more assessment images of the assessment indicators while or after a user performs the medical procedure, analyzing the assessment indicators in the one or more assessment images, and providing feeding back to a user.

Embodiment 37 can include, or can optionally be combined with the subject matter of one or any combination of Embodiments 1-36, to optionally include the providing of feedback to the user comprising providing one or both of a cumulative score or formative feedback.

Embodiment 38 can include, or can optionally be combined with the subject matter of one or any combination of Embodiments 1-37, to optionally include the analyzing of the assessment indicators in the one or more assessment images comprising comparing the assessment indicators to a reference.

Embodiment 39 can include, or can optionally be combined with the subject matter of one or any combination of Embodiments 1-38, to optionally include the reference comprising a reference image or a reference map comprising reference indicators.

Embodiment 40 can include, or can optionally be combined with the subject matter of one or any combination of Embodiments 1-39, to optionally include the comparing of the assessment indicators in the one or more assessment images to the reference comprising comparing the assessment indicators to the reference indicators in the reference image or the reference map.

Embodiment 41 can include, or can optionally be combined with the subject matter of one or any combination of Embodiments 1-40, to optionally include the analyzing of the assessment indicators comprising determining one or more measurable geometric differences between the assessment indicators and the reference.

Embodiment 42 can include, or can optionally be combined with the subject matter of one or any combination of Embodiments 1-41, to optionally include the comparing of the assessment indicators to the reference comprising registering the assessment image with the reference and creating an overlay of the assessment indicators of the registered assessment image and the reference.

Embodiment 43 can include, or can optionally be combined with the subject matter of one or any combination of Embodiments 1-42, to optionally include the assessment indicators comprising a material sensitive to a predetermined wavelength of light or range of wavelengths.

Embodiment 44 can include, or can optionally be combined with the subject matter of one or any combination of Embodiments 1-43, to optionally include the capturing of the one or more assessment images comprising exposing the assessment indicators to the predetermined wavelength or range of wavelengths.

Embodiment 45 can include, or can optionally be combined with the subject matter of one or any combination of Embodiments 1-44, to optionally include the assessment indicators including an ultraviolet sensitive material.

Embodiment 46 can include, or can optionally be combined with the subject matter of one or any combination of Embodiments 1-45, to optionally include the ultraviolent sensitive material being transparent under normal light.

Embodiment 47 can include, or can optionally be combined with the subject matter of one or any combination of Embodiments 1-46, to optionally include the ultraviolet sensitive material being a polyurethane-based material.

Embodiment 48 can include, or can optionally be combined with the subject matter of one or any combination of Embodiments 1-47, to optionally include the assessment indicators comprising capsules impregnated with a material, wherein the capsules are configured to expose the material upon exposure to a stimulus source exceeding a stimulus threshold.

Embodiment 49 can include, or can optionally be combined with the subject matter of one or any combination of Embodiments 1-88, to optionally include the capturing of the one or more assessment images comprising exposing the capsules to the stimulus source above the stimulus threshold.

Embodiment 50 can include, or can optionally be combined with the subject matter of one or any combination of Embodiments 1-49, to optionally include the stimulus source comprising at least one of pressure exerted on the capsule, mechanical force exerted on the capsule, heat energy on the capsule, electromagnetic energy on the capsule, light having a predetermined wavelength or range of wavelengths emitted onto the capsule, and a chemical species contacting the capsule.

Embodiment 51 can include, or can optionally be combined with the subject matter of one or any combination of Embodiments 1-51, to optionally include the material comprising at least one of one or more dyes, one or more chemical, one or more metal, and one or more pH indicators.

Embodiment 52 can include, or can optionally be combined with the subject matter of one or any combination of Embodiments 1-51, to optionally include the material being configured to be viewable by one or more image-capturing devices that are configured to capture the one or more assessment images.

Embodiment 53 can include, or can optionally be combined with the subject matter of one or any combination of Embodiments 1-52, to optionally include the capsules being included in a film applied to a surface of the tissue model or the tool.

Embodiment 54 can include, or can optionally be combined with the subject matter of one or any combination of Embodiments 1-53, to optionally include the capsules being an additive within the tissue model or the tool.

Embodiment 55 can include, or can optionally be combined with the subject matter of one or any combination of Embodiments 1-54, to optionally include the tissue model not including any electrical sensors or mechanical sensors.

Embodiment 56 can include, or can optionally be combined with the subject matter of one or any combination of Embodiments 1-55, to include subject matter (such as an apparatus, a device, a method, or one or more means for performing acts), such as can include a method of assessing performance of a procedure. The subject matter can comprise capturing one or more images of a tissue model, analyzing the one or more images to determine a deformation of the tissue model, and determining a force exerted on the tissue model based on the determined deformation of the tissue model.

Embodiment 57 can include, or can optionally be combined with the subject matter of one or any combination of Embodiments 1-56, to optionally include the tissue model including a portion that is transparent or substantially transparent to a particular wavelength of light or range of wavelengths when viewed at a predetermined angle, wherein capturing the one or more images comprises capturing an image of at least the transparent or substantially transparent portion.

Embodiment 58 can include, or can optionally be combined with the subject matter of one or any combination of Embodiments 1-57, to optionally include the tissue model comprising a plurality of layers, each layer comprising the transparent or substantially transparent portion.

Embodiment 59 can include, or can optionally be combined with the subject matter of one or any combination of Embodiments 1-58, to optionally include the one or more image-capturing devices being directed toward one or more edges of the plurality of layers.

Embodiment 60 can include, or can optionally be combined with the subject matter of one or any combination of Embodiments 1-59, to optionally include the analyzing the one or more images as comprising distinguishing each of the plurality of layers in the one or more images.

Embodiment 61 can include, or can optionally be combined with the subject matter of one or any combination of Embodiments 1-60, to optionally include the capturing the one or more images as comprising capturing a first image of a first position of the tissue model and capturing a second image of a second position of the tissue model.

Embodiment 62 can include, or can optionally be combined with the subject matter of one or any combination of Embodiments 1-61, to optionally include the determining the force exerted on the tissue model being based on known mechanical properties of the tissue model and the determined deformation of the tissue model.

Embodiment 63 can include, or can optionally be combined with the subject matter of one or any combination of Embodiments 1-62, to optionally include determining mechanical properties of the tissue model.

Embodiment 64 can include, or can optionally be combined with the subject matter of one or any combination of Embodiments 1-63, to optionally include determining a performance score based on the determined force.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system for assessing performance of a medical procedure, the system comprising:
   a tissue model comprising one or more assessment indicators applied thereto, the tissue model is physically altered by physical manipulation of the tissue model during the medical procedure, wherein the physical manipulation is selected from a group consisting of clipping the tissue model, incision of the tissue model, suturing of the tissue model, excision of a portion of the tissue model, tearing the tissue module, dilating an opening or passage in the tissue module, grasping or clamping a portion of the tissue model, and retracting a portion of the tissue model, wherein the physical manipulation physically alters the one or more assessment indicators;
   wherein the one or more assessment indicators comprise a material sensitive to a predetermined wavelength of light or range of wavelengths or the one or more assessment indicators comprise capsules impregnated with an indicator material, wherein the capsules are configured to expose the indicator material upon exposure to a stimulus source exceeding a stimulus threshold;
   one or more image-capturing devices for capturing one or more assessment images of the one or more assessment indicators while or after the user performs the medical procedure on the tissue model; and
   a processor configured to:
   analyze the one or more assessment indicators in the one or more assessment images to determine a physical alteration of the one or more assessment indicators during the medical procedure; and
   provide feedback to the user regarding performance of the medical procedure based on the physical alteration of the one or more assessment indicators.

2. The system of claim 1, wherein the feedback provided to the user comprises one or both of a summative score or formative feedback regarding performance of the medical procedure based on the alteration of the one or more assessment indicators.

3. The system of claim 1, wherein the processor is configured to determine the physical alteration of the one or more assessment indicators by comparing the one or more assessment indicators to a reference.

4. The system of claim 3, wherein the reference comprises a reference image or a reference map comprising one or more reference indicators; and
   wherein the processor is configured to compare the one or more assessment indicators in the one or more assessment images to the one or more reference indicators in the reference image or the reference map.

5. The system of claim 1, wherein the capsules are included in a film applied to a surface of the tissue model or the capsules are an additive within the tissue model.

6. The system of claim 1, wherein the tissue model does not include any electrical sensors or mechanical sensors.

* * * * *

UNITED STATES PATENT AND TRADEMARK OFFICE
CERTIFICATE OF CORRECTION

PATENT NO. : 10,553,130 B2
APPLICATION NO. : 14/398090
DATED : February 4, 2020
INVENTOR(S) : Poniatowski et al.

It is certified that error appears in the above-identified patent and that said Letters Patent is hereby corrected as shown below:

On the Title Page

On page 2, in Column 2, item (56), under "Other Publications", Line 48, delete ""Internnational" and insert --"International-- therefor On page 3, in Column 2, item (56), under "Other Publications", Line 1, delete "layer-speci?c" and insert --layer-specific-- therefor In the Specification In Column 7, Line 27, delete "28," and insert --26-- therefor In Column 21, Line 65, delete "$F=kx$" and insert --$F=-kx$-- therefor In the Claims In Column 40, Line 11, in Claim 1, delete "indicators;" and insert --indicators,-- therefor Signed and Sealed this
Tenth Day of November, 2020

Andrei Iancu
*Director of the United States Patent and Trademark Office*